United States Patent
Sasaki

[11] Patent Number: 6,154,346
[45] Date of Patent: Nov. 28, 2000

[54] COMPOSITE TYPE THIN FILM MAGNETIC HEAD HAVING NORMAL STRUCTURE INCLUDING INDUCTIVE TYPE THIN FILM MAGNETIC HEAD AND MAGNETORESISTIVE TYPE THIN FILM MAGNETIC HEAD

[75] Inventor: Yoshitaka Sasaki, Yokohama, Japan

[73] Assignee: TDK Corporation, Tokyo, Japan

[21] Appl. No.: 09/118,183

[22] Filed: Jul. 17, 1998

[30] Foreign Application Priority Data

Dec. 26, 1997 [JP] Japan ................................. 9-360503

[51] Int. Cl.⁷ ........................................ G11B 5/39
[52] U.S. Cl. ................................................. 360/317
[58] Field of Search ................................. 360/113, 317

[56] References Cited

U.S. PATENT DOCUMENTS 5,668,689  9/1997  Schultz ..................................... 360/113
5,793,578  8/1998  Heim ........................................ 360/126

Primary Examiner—A. J. Heinz
Attorney, Agent, or Firm—Oliff & Berridge, PLC

[57] ABSTRACT

A composite type thin film magnetic head, in which saturation and leakage of a magnetic flux can be suppressed although a pole portion is miniaturized and throat height, apex angle and MR height can be precisely formed to have desired values, and a method of manufacturing the same are proposed. A recessed portion 25 is formed in a substrate 23 by using, as a mask, a first magnetic layer 24 constituting a bottom shield for a MR layer 32, a second magnetic layer 27 and a thin film coil 30 are formed within the recessed portion such that the thin film coil is supported by an insulating layer 29 in an isolated manner, surfaces of these first and second magnetic layers and insulating layer are flattened to form a common unit for manufacturing a composite type thin film magnetic head. Then, a third magnetic layer 34 is formed such that the third magnetic layer is coupled with the second magnetic layer 27 to constitute a bottom pole and its surface is flattened. Then a flat write gap layer and a flat fourth magnetic layer 37 constituting a top pole, and the write gap layer and third magnetic layer are dry-etched to form a pole portion while pole portions of the write gap layer and fourth magnetic layer as a mask. On the thin film coil 30 of the common unit, insulating layer or additional thin film coil may be deposited to project upwardly.

26 Claims, 15 Drawing Sheets

PRIOR ART FIG_1A FIG_1B
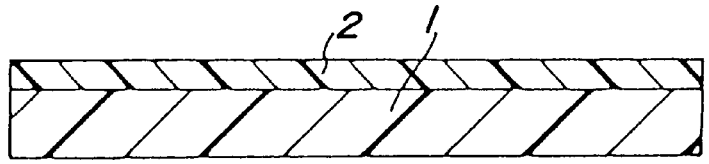 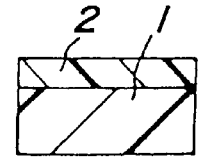
PRIOR ART FIG_2A FIG_2B
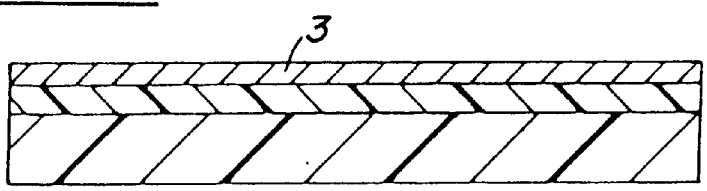 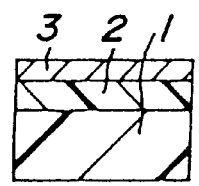
PRIOR ART FIG_3A FIG_3B
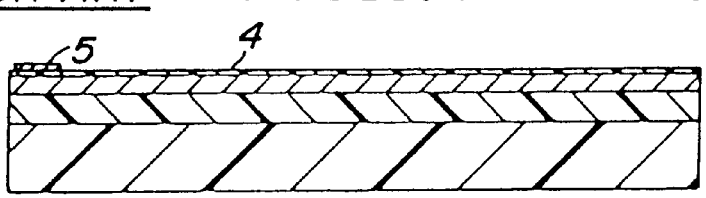 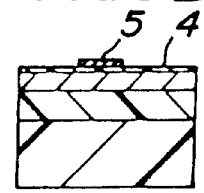
PRIOR ART FIG_4A FIG_4B
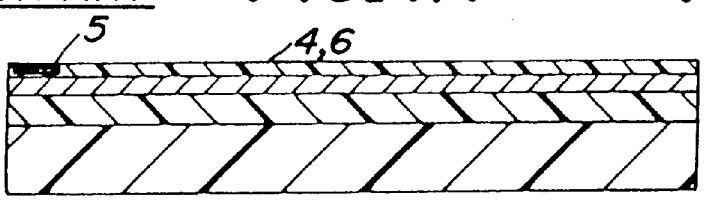 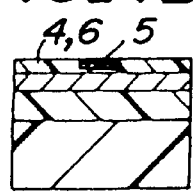
PRIOR ART FIG_5A FIG_5B
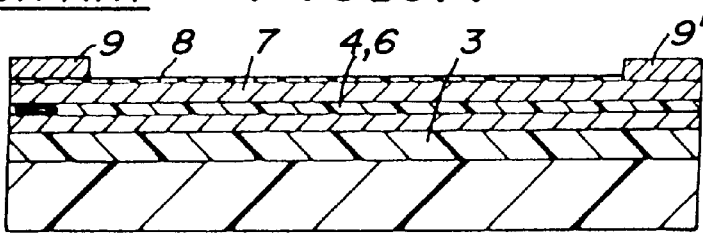 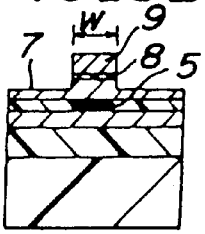
PRIOR ART FIG_6A FIG_6B
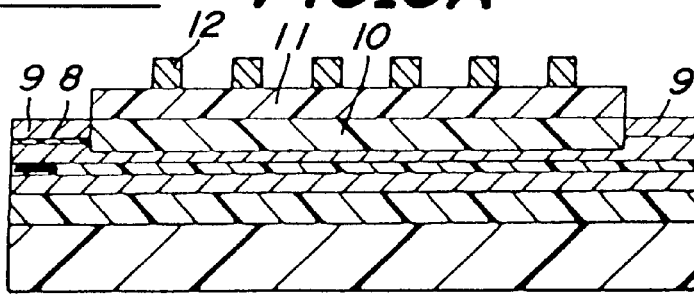 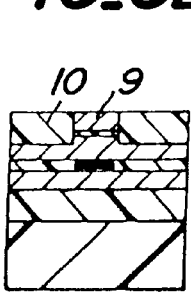

PRIOR ART  FIG_7A  FIG_7B
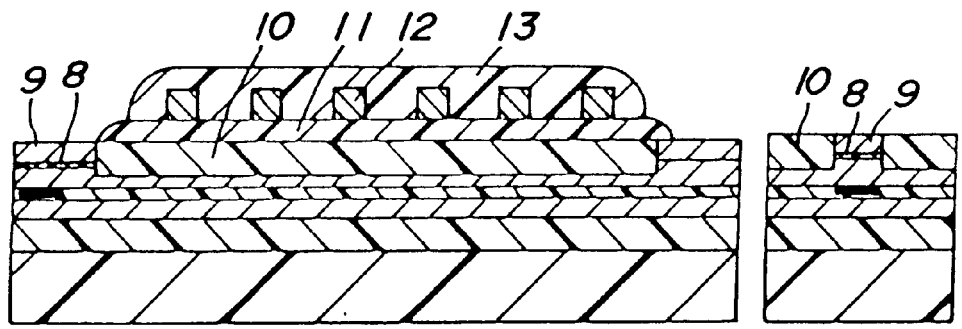
PRIOR ART  FIG_8A  FIG_8B
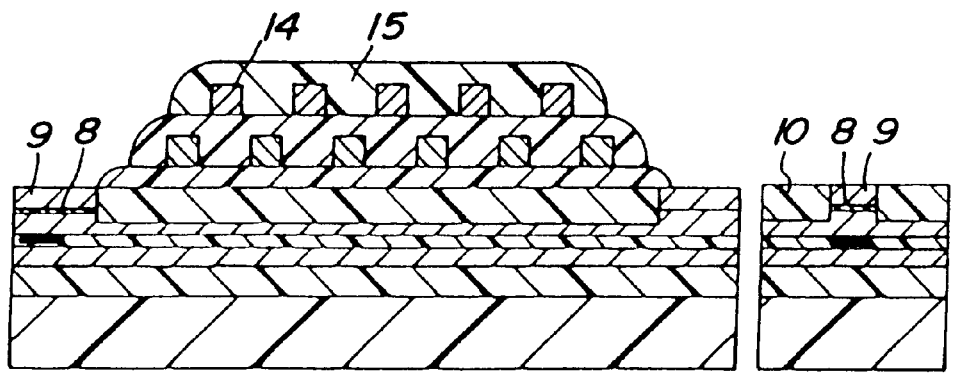
PRIOR ART  FIG_9A  FIG_9B
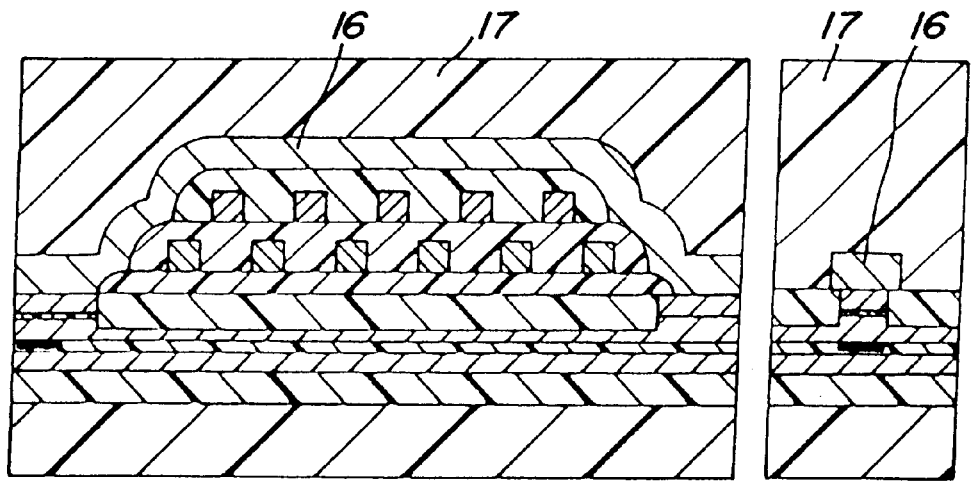

FIG_10
PRIOR ART
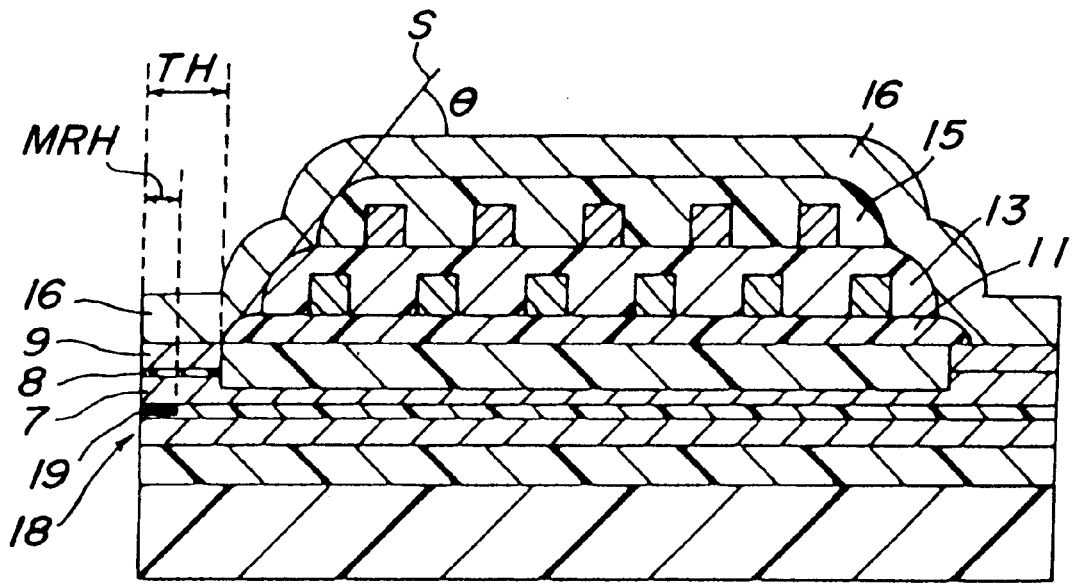
FIG_11
PRIOR ART
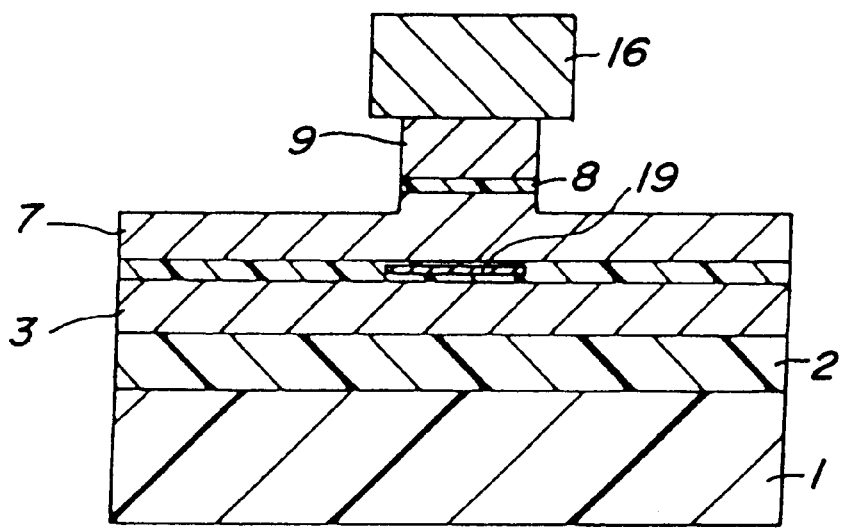

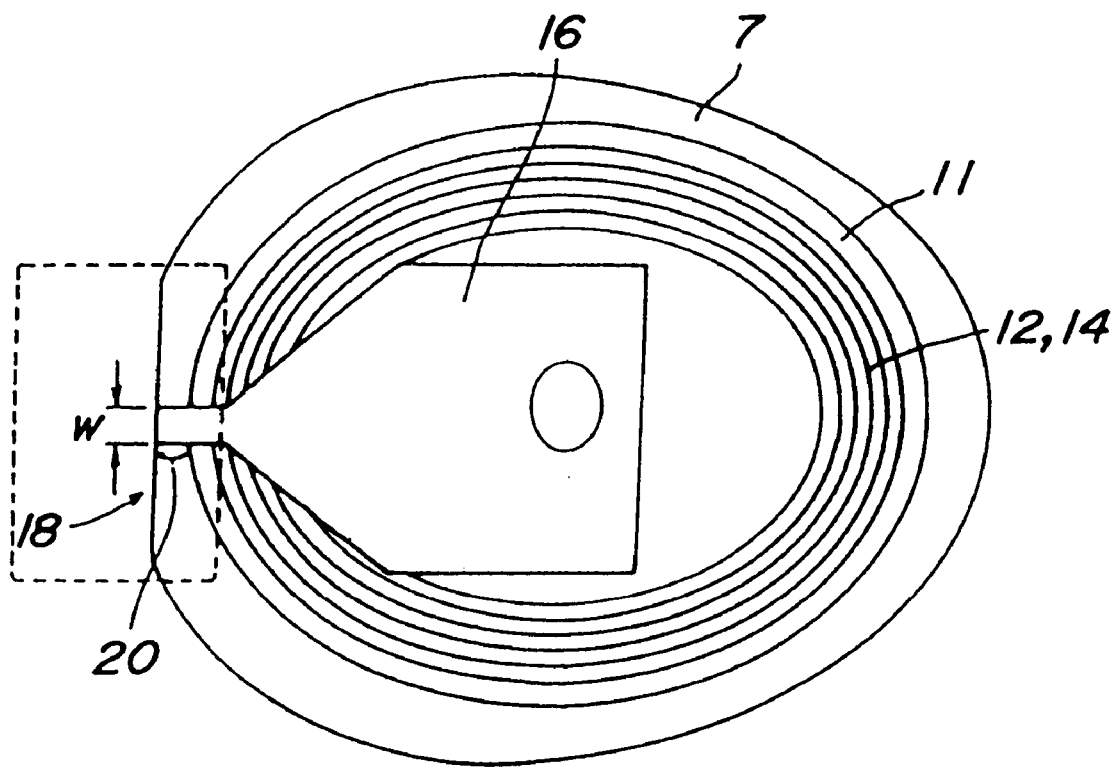
FIG_12
PRIOR ART

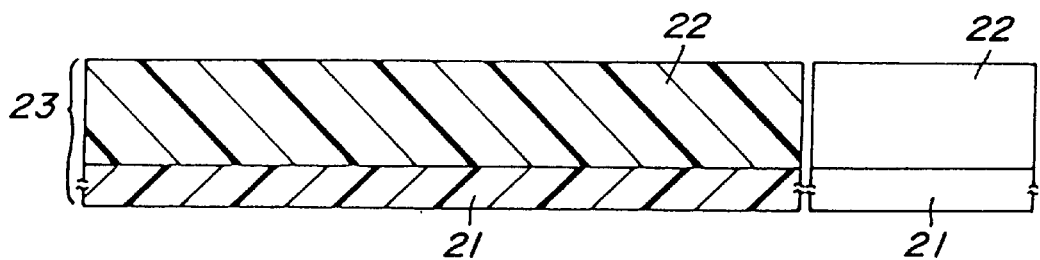
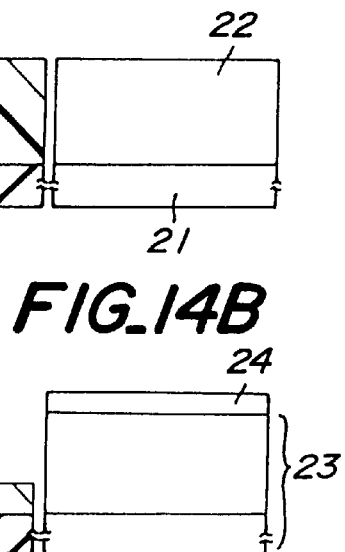
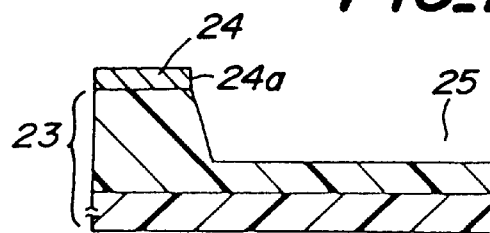
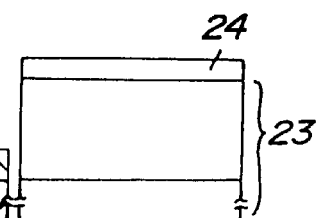
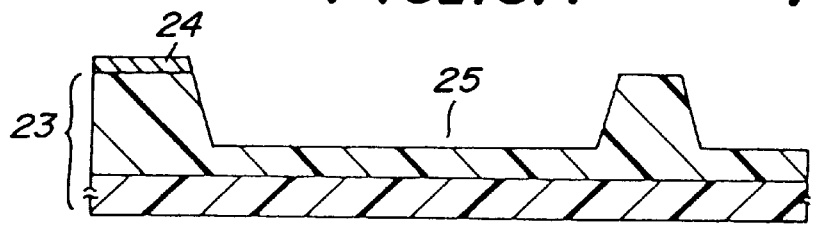
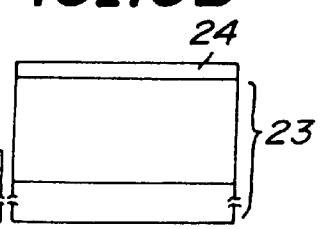
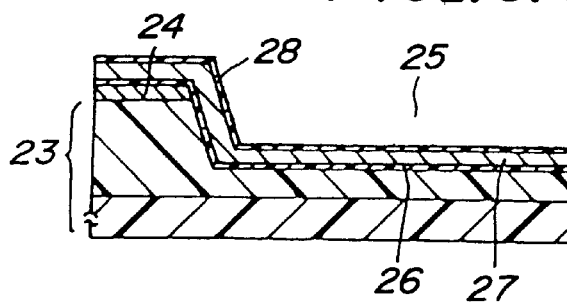
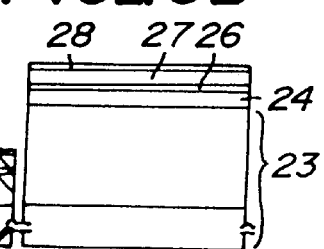

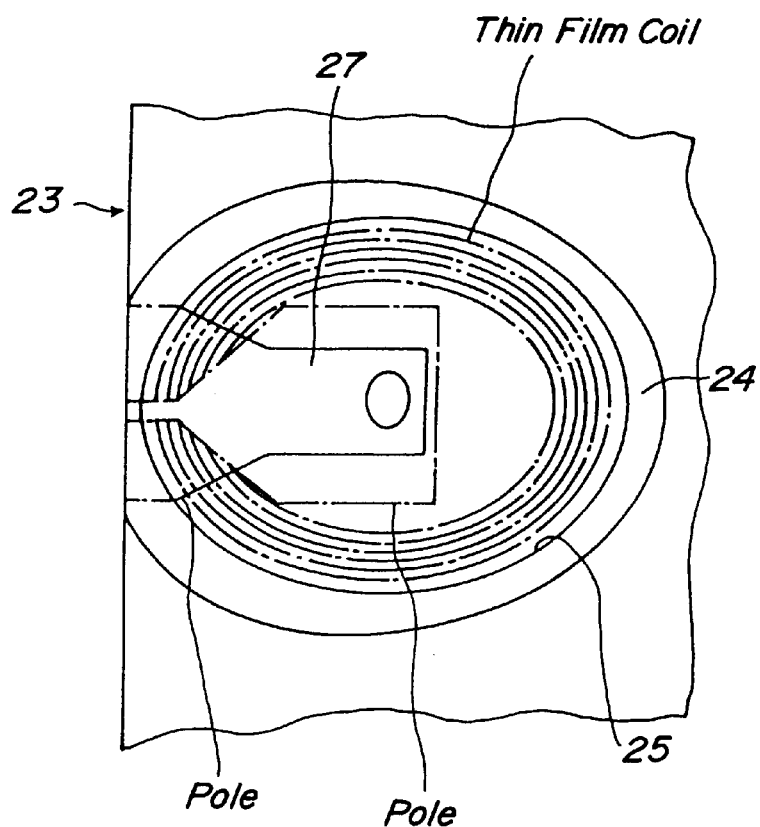
FIG_17
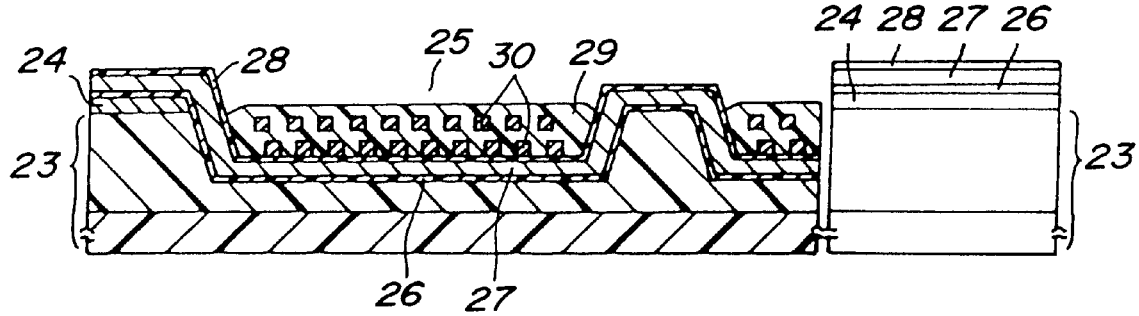
FIG_18A  FIG_18B

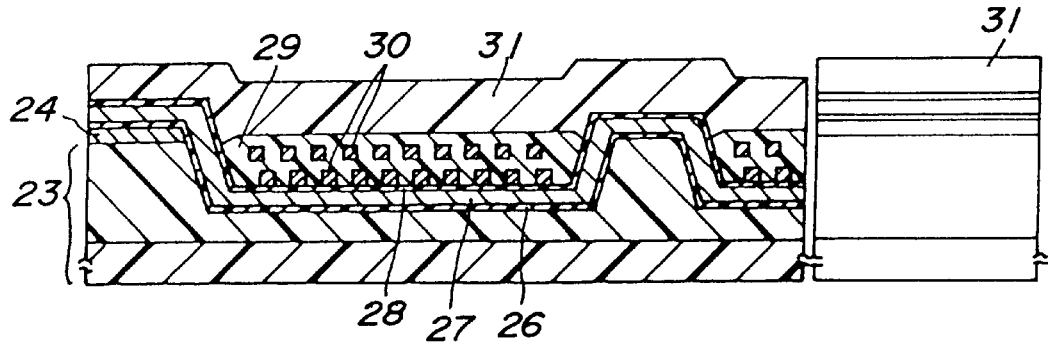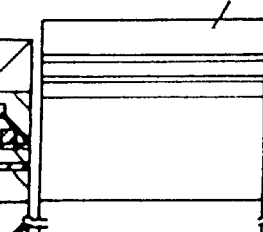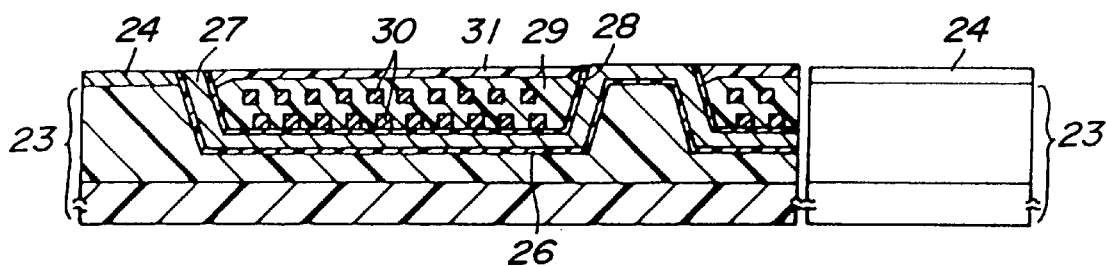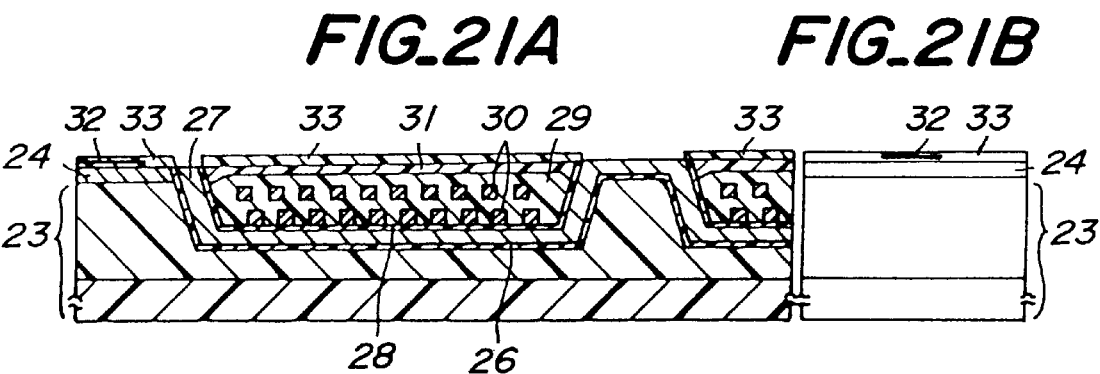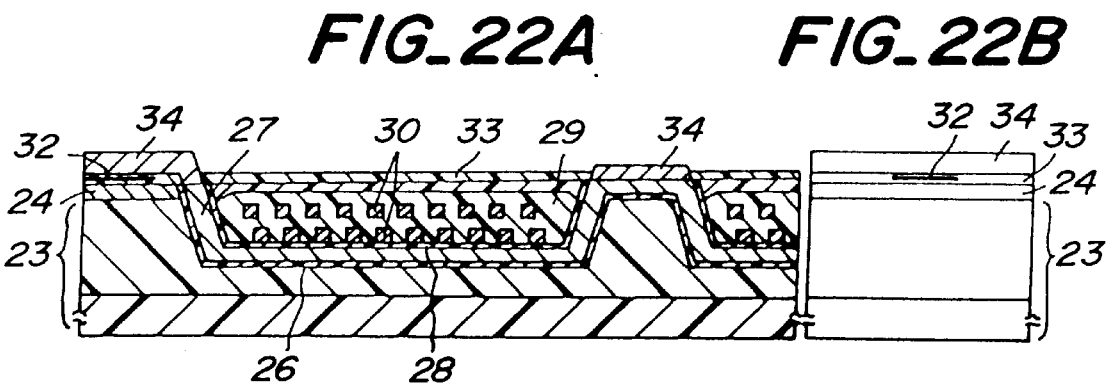

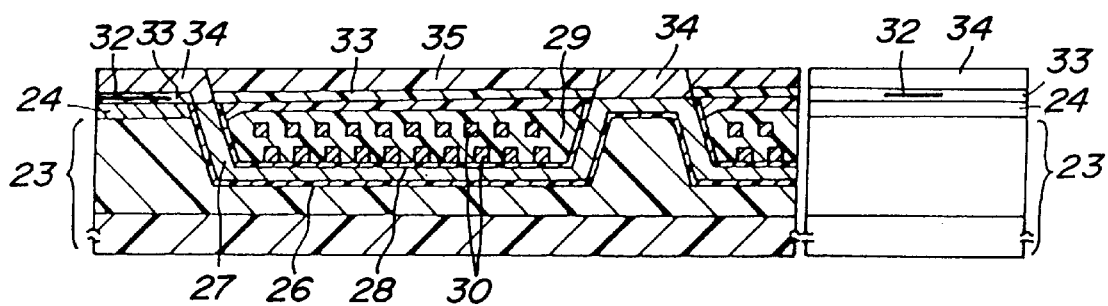
FIG_23A  FIG_23B
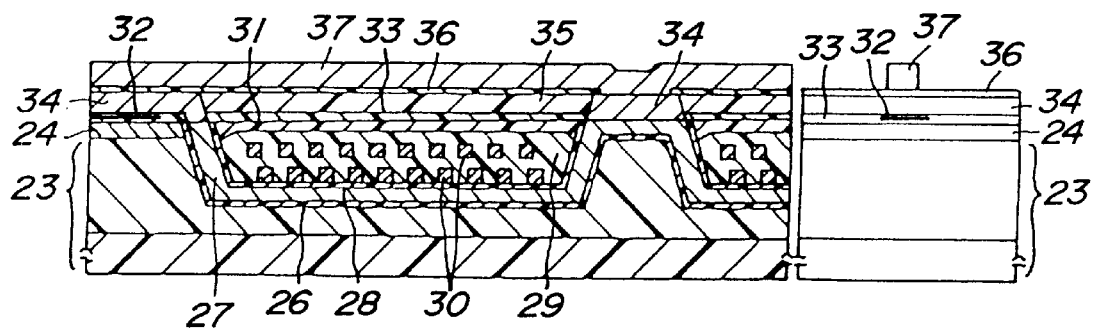
FIG_24A  FIG_24B
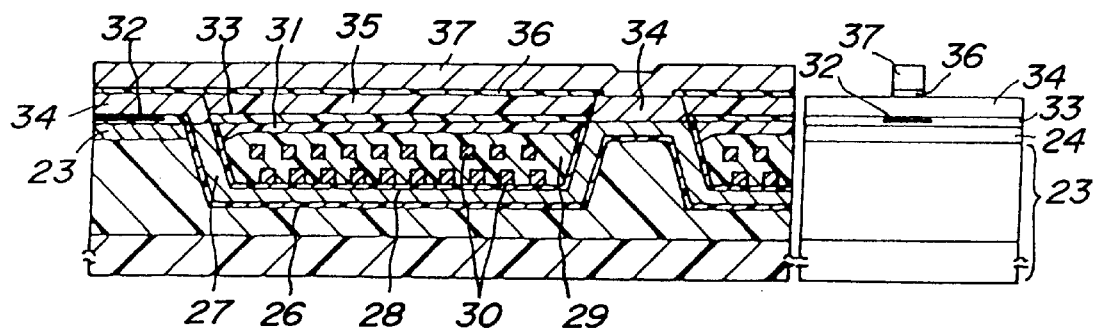
FIG_25A  FIG_25B

FIG_26
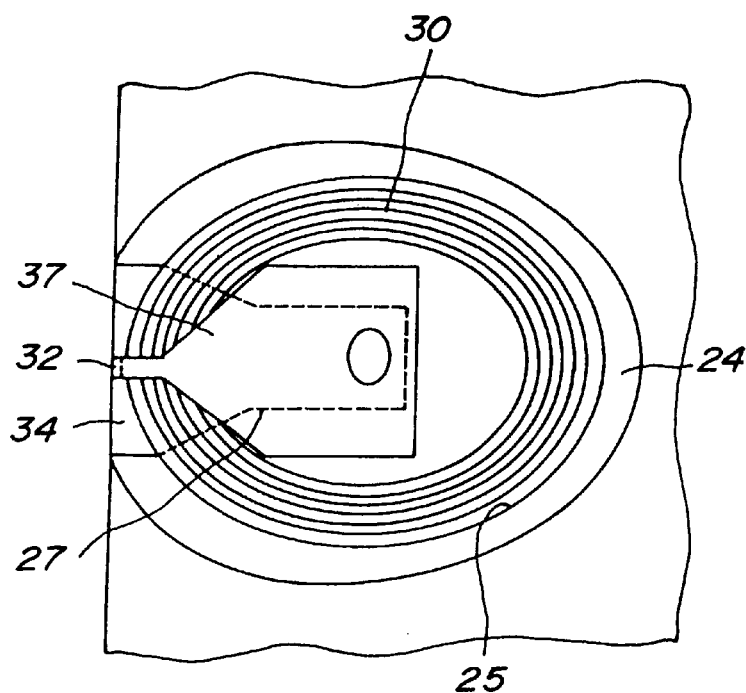
FIG_27A  FIG_27B
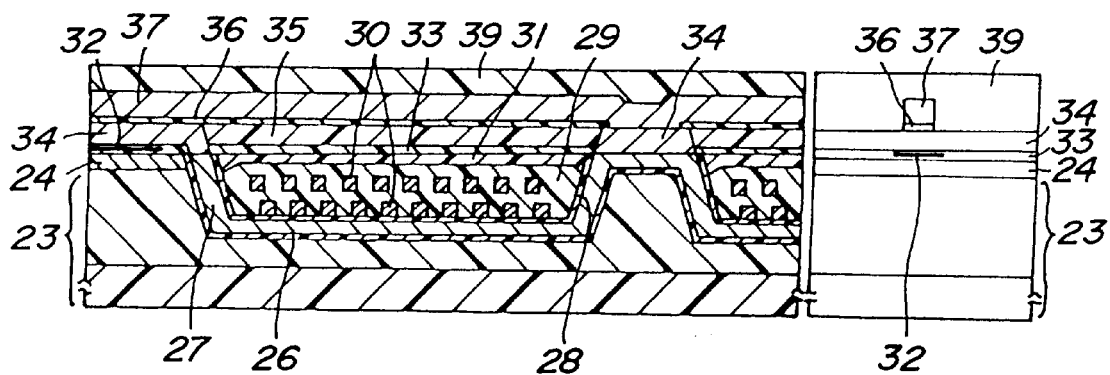

FIG_31
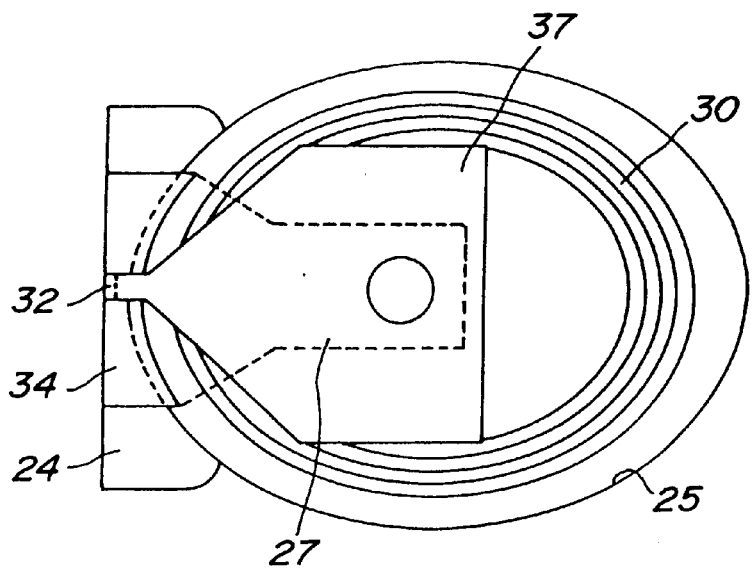
FIG_32A
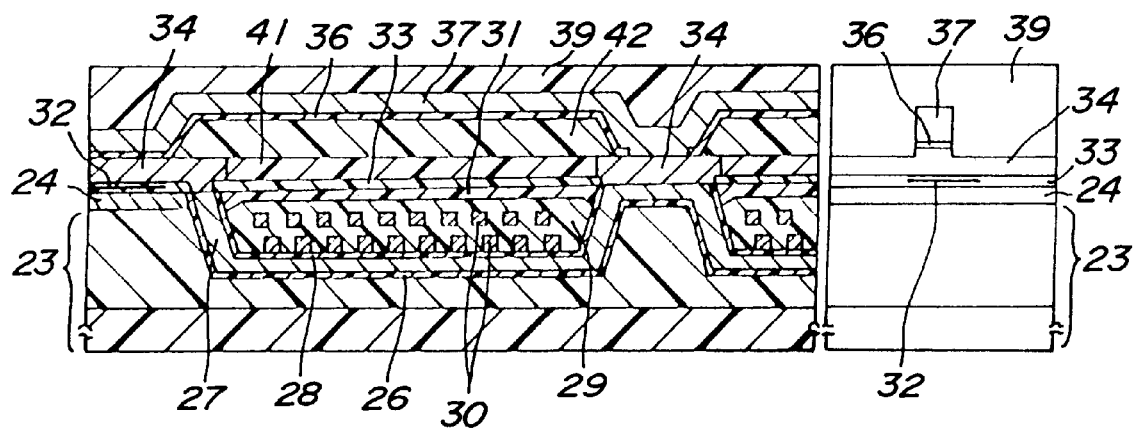
FIG_32B
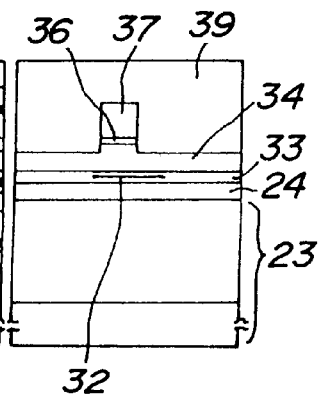

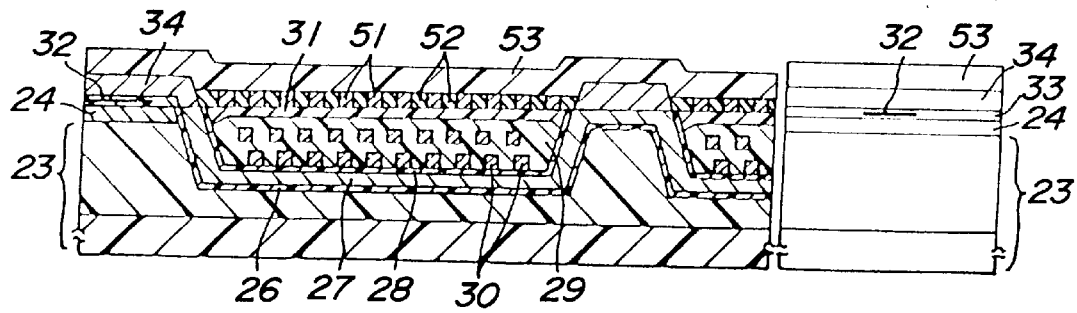
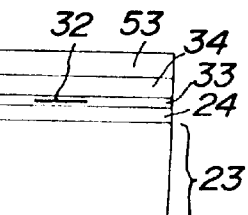
FIG. 33A  FIG. 33B
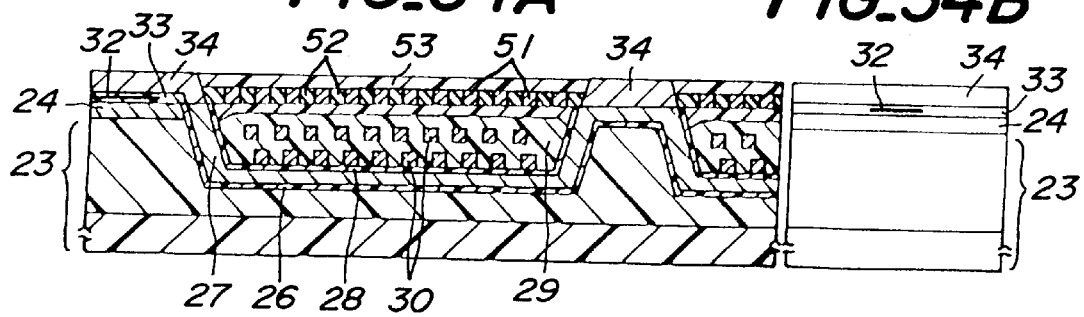
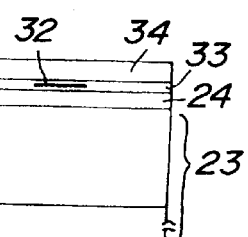
FIG. 34A  FIG. 34B
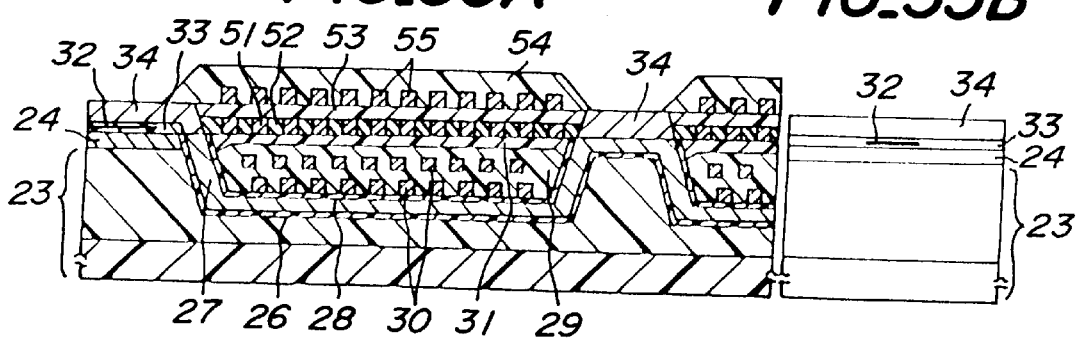
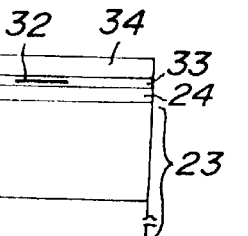
FIG. 35A  FIG. 35B
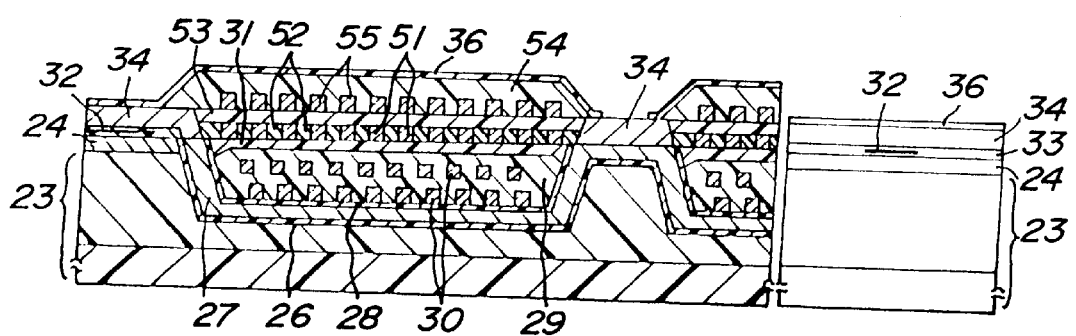
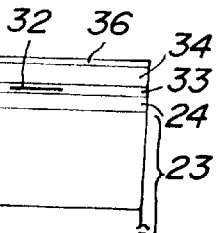
FIG. 36A  FIG. 36B

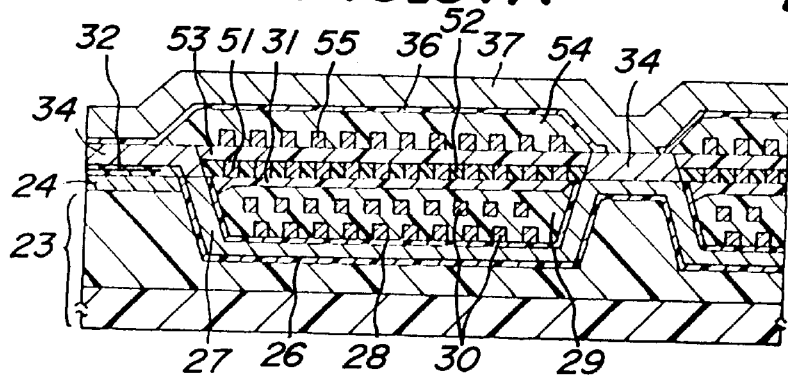
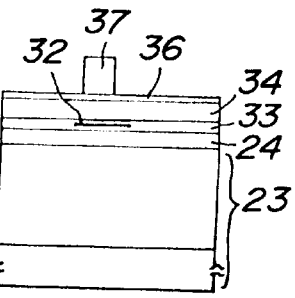
FIG._37A  FIG._37B
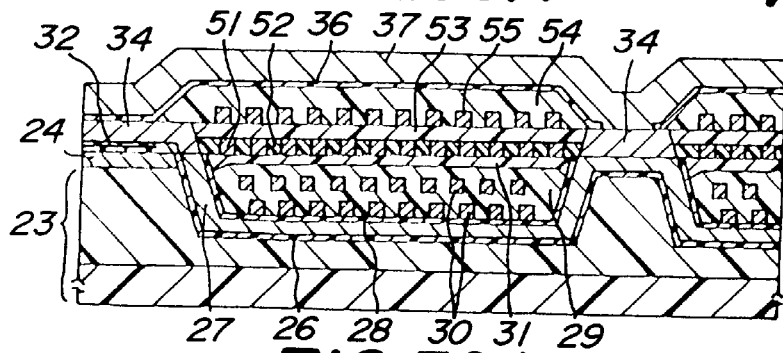
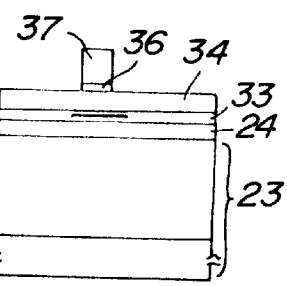
FIG._38A  FIG._38B
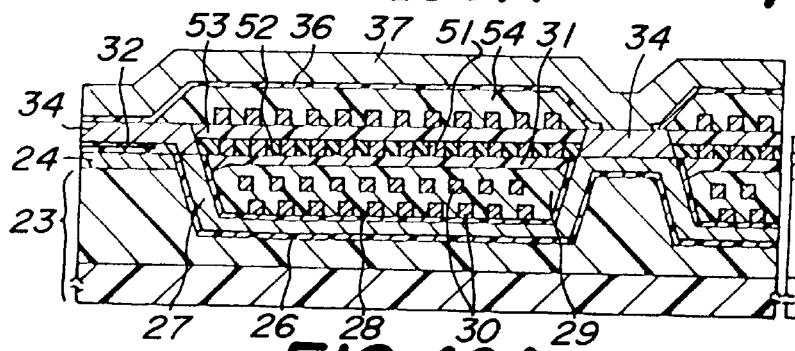
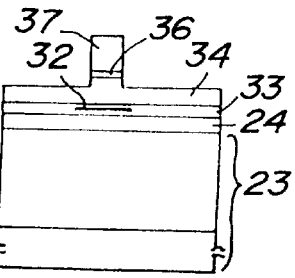
FIG._39A  FIG._39B
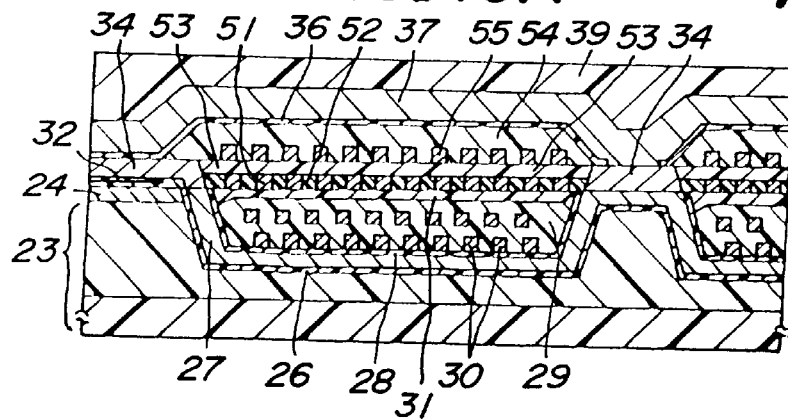
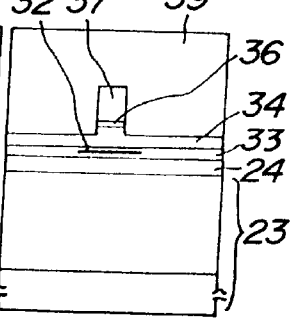
FIG._40A  FIG._40B

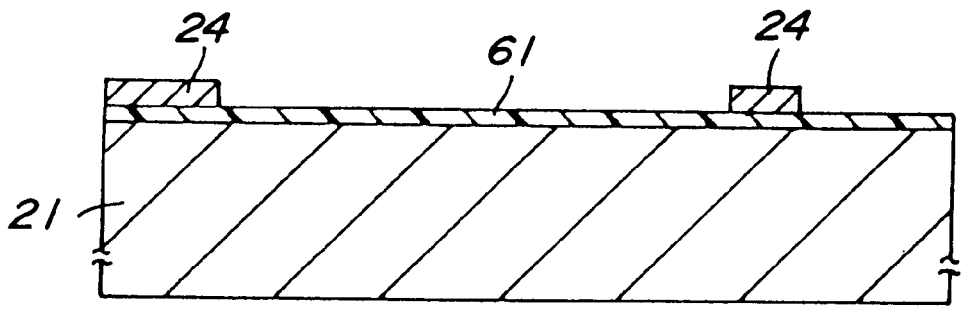
FIG._41
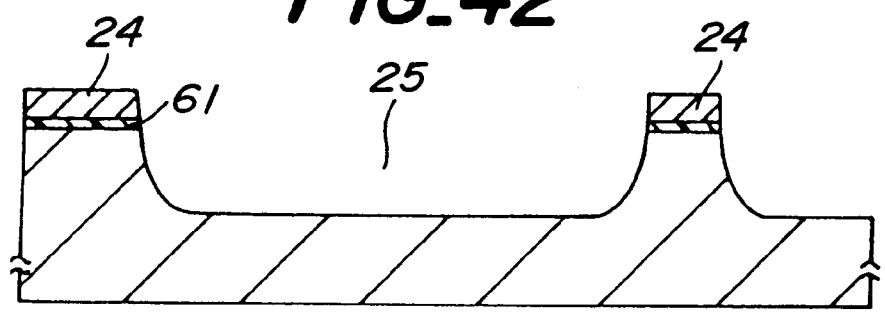
FIG._42
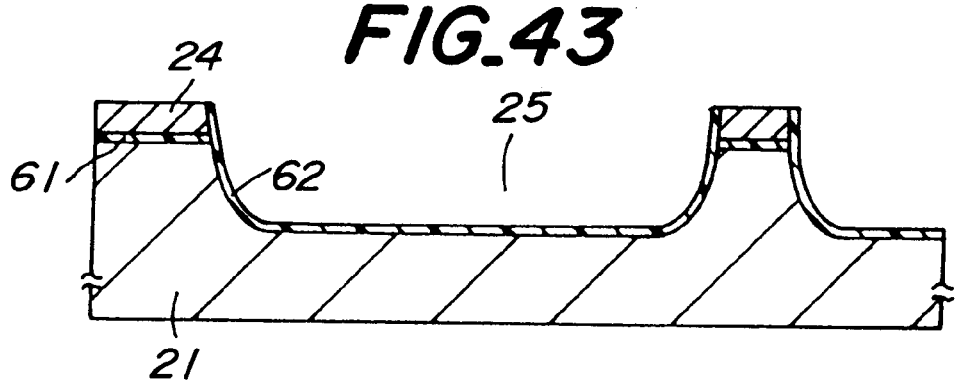
FIG._43
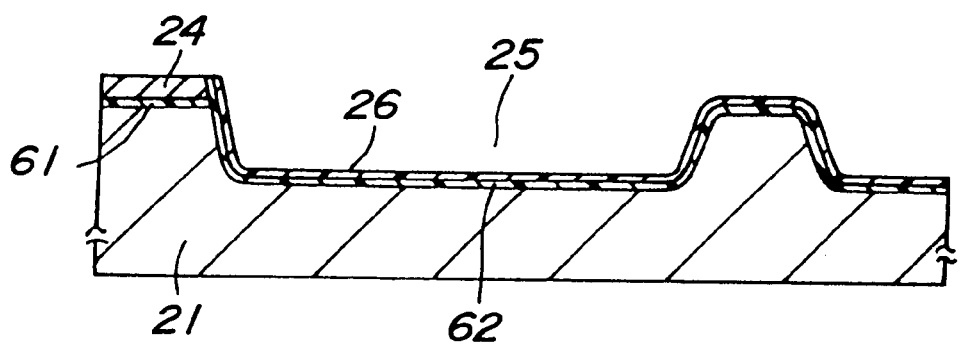
FIG._44

FIG_45A
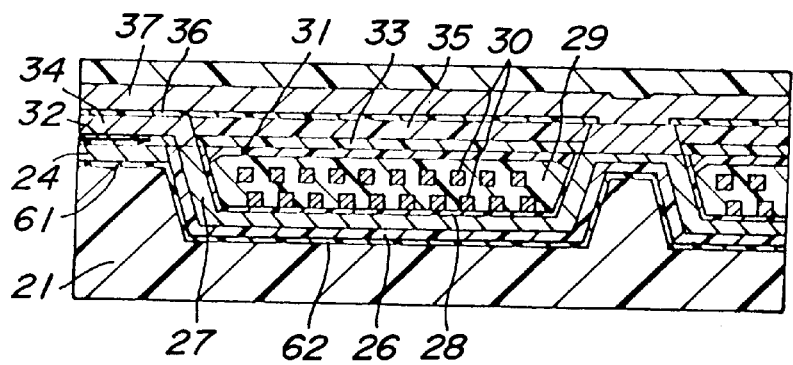
FIG_45B
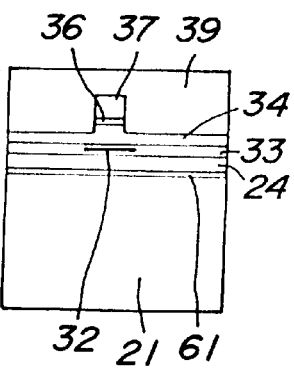
FIG_46A
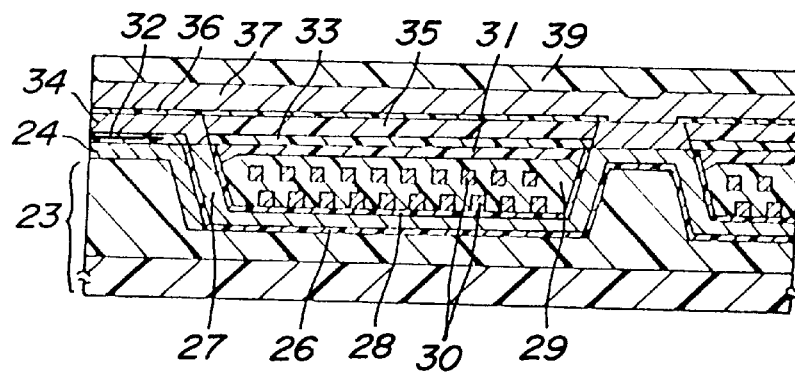
FIG_46B
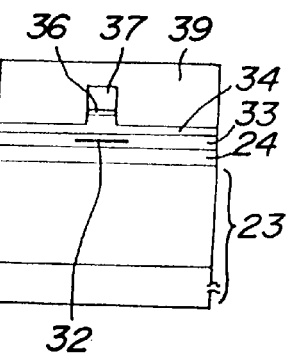

COMPOSITE TYPE THIN FILM MAGNETIC HEAD HAVING NORMAL STRUCTURE INCLUDING INDUCTIVE TYPE THIN FILM MAGNETIC HEAD AND MAGNETORESISTIVE TYPE THIN FILM MAGNETIC HEAD

BACKGROUND OF THE INVENTION

1. Field of the Invention

The present invention relates to a composite type thin film magnetic head constructed by stacking an inductive type writing magnetic transducing element and a magnetoresistive type reading magnetic transducing element on a substrate.

2. Description of the Related Art

Recently a surface recording density of a hard disc device has been improved, and it has been required to develop a thin film magnetic head having an improved performance accordingly. A composite type thin film magnetic head is constructed by stacking an inductive type thin film magnetic head intended for writing and a magnetoresistive type thin film magnetic head intended for reading on a substrate, and has been practically used. In general, as a reading magnetoresistive element, an element utilizing anisotropic magnetoresistive (AMR) effect has been used so far, but there has been further developed a GMR reproducing element utilizing a giant magnetoresistive (GMR) effect having a resistance change ratio higher than that of the normal anisotropic magnetoresistive effect by several times. In the present specification, elements exhibiting a magnetoresistive effect such as AMR and GMR reproducing elements are termed as a magnetoresistive reproducing element or MR reproducing element.

By using the AMR reproducing element, a very high surface recording density of several gigabits/inch$^2$ has been realized, and a surface recording density can be further increased by using the GMR element. By increasing a surface recording density in this manner, it is possible to realize a hard disc device which has a very large storage capacity of more than 10 gigabytes.

A height (MR Height: MRH) of a magnetoresistive reproducing element is one of factors which determine a performance of a reproducing head including a magnetoresistive reproducing element. The MR height MRH is a distance measured from an air bearing surface on which one edge of the magnetoresistive reproducing element is exposed to the other edge of the element remote from the air bearing surface. During a manufacturing process of the magnetic head, a desired MR height MRH can be obtained by controlling an amount of polishing the air bearing surface.

At the same time, the performance of the recording magnetic head is also required to be improved in accordance with the improvement of the performance of the reproducing magnetic head. In order to increase a surface recording density, it is necessary to make a track density on a magnetic record medium as high as possible. For this purpose, a width of a write gap at the air bearing surface has to be reduced to a value within a range from several micron meters to several sub-micron meters. In order to satisfy such a requirement, the semiconductor manufacturing process has been adopted for manufacturing the thin film magnetic head.

One of factors determining the performance of the inductive type thin film writing magnetic head is a throat height TH. This throat height TH is a distance of a pole portion measured from the air bearing surface to an edge of an insulating layer which serves to separate a thin film coil from the air bearing surface. It has been required to shorten this distance as small as possible. The reduction of this throat height is also decided by an amount of polishing the air bearing surface.

Therefore, in order to improve the performance of the composite type thin film magnetic head having the writing inductive type thin film magnetic head and reading magnetoresistive type thin film magnetic head stacked one on the other, it is important that the recording inductive type thin film magnetic head and reproducing magnetoresistive type thin film magnetic head are formed with a good balance.

FIGS. 1–9 show successive steps for manufacturing a conventional standard thin film magnetic head, in these drawings A depicts a cross-sectional view of a substantial portion of the head and B represent a cross sectional view of a pole portion. Moreover, FIGS. 10–12 are a cross sectional view of a substantial portion of the completed thin film magnetic head, a cross sectional view of the pole portion, and a plan view of the substantial portion of the thin film magnetic head, respectively. It should be noted that the thin film magnetic head is of a composite type in which the inductive type thin film magnetic head for writing is stacked on the reproducing MR element.

First of all, as shown in FIG. 1, an insulating layer 2 consisting of, for example alumina ($Al_2O_3$) is deposited on a substance 1 made of a non-magnetic and electrically insulating material such as AlTiC and having a thickness of about 5–10 μm. Next, as shown in FIG. 2, a first magnetic layer 3 which constitutes one of magnetic shields protecting the MR reproduction element of the reproducing head from the influence of an external magnetic field, is formed with a thickness of 3 μm. Afterwards, as shown in FIG. 3, after depositing an insulating layer 4 of thickness 100–150 nm serving as a shield gap layer by spattering alumina, a magnetoresistive layer 5 made of a material having the magnetoresistive effect and constituting the MR reproduction element is formed on the shield gap layer with a thickness of several tens nano meters and is then shaped into a given pattern by the highly precise mask alignment.

Then, as shown in the FIG. 4, an insulating layer 6 is formed such that the magnetoresistive layer 5 is embedded within the insulating layers 4 and 6.

Next, as shown in the FIG. 5, a second magnetic layer 7 made of a permalloy is formed with a film thickness of 3 μm. This second magnetic layer 7 has not only the function of the upper shield layer which magnetically shields the MR reproduction element together with the above described lower shield layer 3, but also has the function of one of poles of the writing thin film magnetic head.

Then, after forming a write gap layer 7 made of a non-magnetic material such as alumina and having a thickness of about 200 nm on the second magnetic layer 7, a pole chip 9 made of a material having a high saturation magnetic flux density such as permalloy (Ni:50 wt %, Fe:50 wt %) and nitride iron (FeN) is formed with a desired shape by the highly precise mask alignment. A track width is determined by a width W of the pole chip 9. Therefore, in order to realize a high surface recording density, it is necessary to decrease the width W. In this case, a dummy pattern 9' for coupling the bottom pole (first magnetic layer) with the top pole (third magnetic layer) is formed simultaneously. Then, a throughhole can be easily formed by polishing or chemical mechanical polishing (CMP).

In order to prevent an effective width of writing track from being widened, that is, in order to prevent a magnetic flux from being spread at the bottom pole upon the data writing, portions of the gap layer 8 and second magnetic layer 7 constituting the other pole surrounding the pole chip 9 are etched by an ion beam etching such as ion milling. The structure after this process is shown in FIG. 5. This structure is called a trim structure and this portion serves as a pole portion of the first magnetic layer.

Next, as shown in FIG. 6, after forming an insulating layer, for example alumina film 10 with a thickness of about 3 $\mu$m, the whole surface is flattened by, for instance CMP. Subsequently, after forming an electrically insulating photoresist layer 11 into a given pattern by the mask alignment of high precision, a first layer thin film coil 12 made of, for instance copper is formed on the photoresist layer 11. Continuously, as shown in FIG. 7, after forming an electrically insulating photoresist layer 13 on the thin film coil 12 by the highly precise mask alignment, the photoresist layer is sintered at a temperature of, for example 250–300° C.

In addition, as shown in FIG. 8, a second layer thin film coil 14 is formed on the flattened surface of the photoresist layer 13. Next, after forming a photoresist layer 15 on the second layer thin film coil 14 with the highly precise mask alignment, the photoresist layer is flattened by performing the sintering process at a temperature of, for example 250° C. As described above, the reason why the photoresist layers 11, 13 and 15 are formed by the highly precise mask alignment process, is that the throat height and MR height are defined on the basis of a position of the edges of the photoresist layers on a side of the pole portion.

Next, as shown in FIG. 9, a third magnetic layer 16 made of, for example a permalloy and having a thickness of 3 $\mu$m is selectively formed on the pole chip 9 and photoresist layers 11, 13 and 15 in accordance with a desired pattern.

This third magnetic layer 16 is coupled with the first magnetic layer 7 at a rear position remote from the pole portion through the dummy pattern 9', and the thin film coil 12, 14 passes through a closed magnetic circuit composed of the second magnetic layer, pole chip and third magnetic layer. Furthermore, an overcoat layer 17 made of alumina is deposited on the exposed surface of the third magnetic layer 16.

Finally, a side surface of an assembly at which the magnetoresistive layer 5 and gap layer 8 are formed is polished to form an air bearing surface (ABS) 18 which is to be opposed to the magnetic record medium. During the formation of the air bearing surface 18, the magnetoresistive layer 5 is also ground to obtain a MR reproduction element 19. In this way, the above described throat height TH and the MR height MRH are determined. This condition is shown in FIG. 10. In an actual thin film magnetic head, electric conductors and contact pads for performing the electrical connection to the thin film coils 12, 14 and MR reproduction element 19 are formed, but they are not shown in the drawings.

As shown in FIG. 10, an angle θ (apex Angle) between a line S connecting side corners of the photoresist layers 11, 13, 15 for isolating the thin film coils 12, 14 and the upper surface of the third magnetic layers 16 is an important factor for determining the performance of the thin film magnetic head together with the above described throat height TH and MR height.

Moreover, as shown in the plan view of FIG. 12, the width W of the pole chip 9 and a pole portion 20 of the third magnetic layer 16 is small. Since the width of the track recorded on the magnetic record medium is defined by this width W, it is necessary to narrow this width as small as possible in order to achieve a high surface recording density. It should be noted that in this figure, for the sake of convenience, the thin film coils 12, 14 are shown concentrically.

In the method of manufacturing the conventional thin film magnetic head, there is a problem that after forming the thin film coil, the top pole could not be formed precisely on the protruded coil section covered with the insulating photoresist especially along the inclined surface (apex).

That is to say, in the known method, the third magnetic layer is formed by first plating a magnetic material such as permalloy on the mountain shaped coil with a height of about 7–10 $\mu$m, by applying the photoresist with a thickness of 3–4 $\mu$m, and by shaping the magnetic layer into a given pattern by means of the photolithography technology. Now it is assumed that the photoresist formed on the protruded coil portion into a given pattern should have a thickness of 3 $\mu$m or more, a thickness of the photoresist at a bottom or root of the inclined portion would amount to about 8–10 $\mu$m. On the one hand, the third magnetic layer formed on the protruded coil portion having a height of about 10 $\mu$m as well as on the write gap layer formed on the flat surface should have a narrow portion in the vicinity of the edges of the insulating photoresist layers (for instance layers 11 and 13 in FIG. 7) in order to realize a narrow track width. Therefore, it is necessary to form the pattern having a width of 1 $\mu$m by using the photoresist film having a large thickness of 8–10 $\mu$m.

However, it is extremely difficult to form the photoresist film having a thickness of 8–10 $\mu$m into a pattern having a width of about 1 $\mu$m, because upon the light exposure in the photolithography, a pattern deformation might occur due to reflection of light and resolution is reduced due to the thick photoresist layer. In this manner, it is extremely difficult to form a top pole defining precisely a narrow track width by patterning. Then, as is shown in the above explained conventional thin film magnetic head, in order to write data by means of the pole chip capable of forming the narrow track width, after forming the pole chip, the top pole is formed to be connected to the pole chip. In other words, in order to solve the above problem, a divided structure is adopted, that is, the pole chip for determining the track width and the third magnetic layer for introducing the magnetic flux.

However, the known thin film magnetic head, particularly the recording head formed as in the above manner still has the following problems.

(1) Since a positional relation between the pole chip 9 and the third magnetic layer 16 is determined by the alignment of the photoresist layer, a center line of the pole chip viewed from the air bearing surface might deviate largely from a center line of the third magnetic layer, and thus the magnetic flux might leak. Then, the data writing might be carried out by means of the magnetic flux leaked from the third magnetic layer, and the effective track width might be increased and data might be erroneously recorded on an adjacent track. In order to avoid such a problem, it is necessary to increase a distance between successive tracks. Then, the surface recording density could not be improved.

(2) Since the pole chip 9 having a narrow width is brought into contact with the wider third magnetic layer 16 at right angles, the magnetic flux is liable to be saturated at the contact portion, and therefore a satisfactorily high writing characteristic (Flux Rise Time) could not be obtained.

(3) The throat height TH and MR height are determined by taking a position of the edge of the insulating layer isolating the thin film coil on a side of the pole portion as a reference position, but the insulating layer is usually made of an electrically insulating organic photoresist layer and is liable to be deformed by heat. During the formation of the thin film coil, the insulating layer might be deformed by the heating treatment at about 250° C., and a pattern size of the insulating layer changes, and the throat height TH and MR height might be deviated from desired design values.

(4) In the reading thin film magnetic head including the magnetoresistive element, it is advantage to use GMR element having a higher sensitivity, but the reading sensitivity of the GMR element degrades by the heating treatment at about 250° C. for the photoresist layer during the formation of the thin film coil of the inductive type thin film magnetic head.

(5) The high sensitivity GMR element has such a structure that different kinds of very thin layers of thickness 1–5 nm are stacked on each other. Thus, during many steps which are required to complete the composite type thin film magnetic head after the formation of the GMR element, the MR element might be destroyed by electrostatic charge during the handling, and therefore a manufacturing yield might be disadvantageously decreased.

(6) At a nearly finishing stage of the mass production process of the composite type thin film magnetic head, the thick alumina film having a thickness not less than 30–40 $\mu$m is formed as the overcoat layer for protecting the head and stabilizing the quality. Due to this thick layer, the substrate is liable to be bent. Furthermore, there might be produced many particles during the spattering process. Consequently characteristics of the magnetic head are degraded and defective magnetic heads might be produced. Moreover the formation of the thick alumina film by spattering requires a long time up to 15 hours or more, and therefore the throughput is extremely decreased. Furthermore, the etching process for exposing the contact pads connected to the magnetoresistive element via the electrode pattern takes a disadvantageously long time.

(7) In the composite type thin film magnetic head, the performance of the thin film magnetic head is mainly determined by the width and MR height of the magnetoresistive element of the magnetoresistive type thin film magnetic head, and by the width of the magnetic pole, throat height and NLTS (Non-Linear Transition Shift) of the inductive type thin film magnetic head. Therefore, demands of users are focused to these parameters. For example, the width of the magnetoresistive element may be designated by users as particular specifications. Since this dimension is determined at an early stage in the manufacturing process of the conventional composite type thin film magnetic head, a time from an order to a supply of products, i.e. the cycle time is prolonged, and sometimes amounts to 30–40 days.

SUMMARY OF THE INVENTION

It is an object of the present invention to provide a composite type thin film magnetic head and a method of manufacturing the same, in which various problems of the above mentioned known composite type thin film magnetic head and the known method of manufacturing the same can be solved or at least mitigated.

It is another object of the invention to provide a common unit for composite type thin film magnetic head which can be commonly used for composite type thin film heads having various characteristics.

According to the invention, a composite type thin film magnetic head in which a magnetoresistive type thin film magnetic head for reading and an inductive type thin film magnetic head for writing are supported by a substrate in a stacked fashion, comprises:

a substrate having a recessed portion formed in one surface thereof;

a first magnetic layer constituting one of shields for the magnetoresistive type thin film magnetic head and extending along said surface of the substrate from an end surface forming an air bearing surface to a vicinity of an edge of said recessed portion or to an inner surface of the recessed portion beyond the edge thereof;

a second magnetic layer constituting a part of one of poles for the inductive type thin film magnetic head and extending over a part of the inner surface of the recessed portion such that the second magnetic layer is magnetically separated from the first magnetic layer;

a thin film coil of the inductive type thin film magnetic head, at least a part of said thin film coil being formed within said recessed portion in an electrically isolated manner by an insulating film;

a magnetoresistive element arranged within a shield gap layer in an electrically and magnetically separated manner, said shield gap layer extending along a surface of said first magnetic layer opposite to the substrate;

a third magnetic layer constituting the other shield for the magnetoresistive type thin film magnetic head and extending along a surface of said shield gap layer opposite to the substrate, said third magnetic layer being coupled with said second magnetic layer formed within said recessed portion to constitute a rest of said one of poles of the inductive type thin film magnetic head;

a write gap layer extending at least along a surface of the third magnetic layer opposite to the substrate; and a fourth magnetic layer constituting the other pole of the inductive type thin film magnetic head, extending along a surface of said write gap layer opposite to the substrate to be opposed to said third magnetic layer and being coupled with said second magnetic layer at a rear position remote from the air bearing surface.

According to the invention, a method of manufacturing a composite type thin film magnetic head in which a magnetoresistive type thin film magnetic head for reading and an inductive type thin film magnetic head for writing are supported by a substrate in a stacked fashion, comprises:

the step of forming a recessed portion in a surface of the substrate;

the step of forming a first magnetic layer constituting one of shields for the magnetoresistive type thin film magnetic head such that the first magnetic layer extends along the surface of the substrate from an end surface forming an air bearing surface to a vicinity of an edge of the recessed portion;

the step of forming a second magnetic layer constituting a part of one of poles for the inductive type thin film magnetic head such that the second magnetic layer extends along a part of an inner surface of the recessed portion in a magnetically isolated manner from the first magnetic layer;

the step of forming at least a part of a thin film coil for the inductive type thin film magnetic head within the recessed portion such that the thin film coil is isolated by an insulating layer;

the step of forming a magnetoresistive element along the surface of the first magnetic layer such that the magnetoresistive element extends in an electrically insulated and magnetically isolated manner;

the step of forming a third magnetic layer constituting the other shield for the magnetoresistive type thin film magnetic head such that the third magnetic layer extends along the magnetoresistive element and is coupled with said second magnetic layer formed within said recessed portion to constitute the remaining part of said one of poles for the inductive type thin film magnetic head;

the step of forming a write gap layer such that the write gap layer extends along at least a surface of the third magnetic layer;

the step of forming a fourth magnetic layer along a surface of the write gap layer such that the fourth magnetic layer is opposed to said third magnetic layer and is magnetically coupled with said second magnetic layer at a rear position remote from the air bearing surface to constitute the other pole for the inductive type thin film magnetic head; and the step of polishing the air bearing surface.

Furthermore, according to the invention, a method of manufacturing a composite type thin film magnetic head in which a magnetoresistive type thin film magnetic head for reading and an inductive type thin film magnetic bead for writing are supported by a substrate in a stacked fashion, comprises:

the step of manufacturing and stocking, on a large scale, common units commonly usable for composite type thin film magnetic heads having various characteristics, each of said common units including a substrate having a recessed portion formed therein, a first magnetic layer constituting one of shields for the magnetoresistive type thin film magnetic head and extending along a surface of the substrate from an end surface constituting an air bearing surface at least to a vicinity of an edge of said recessed portion, a second magnetic layer constituting a part of one of poles for the inductive type thin film magnetic head and extending over a part of an inner surface of the recessed portion such that the second magnetic layer is magnetically separated from the first magnetic layer, and at least a part of a thin film coil of the inductive type thin film magnetic head formed within said recessed portion in an electrically isolated manner by an insulating film; and said method further comprising a step of processing a common unit in accordance with characteristics of a composite type thin film magnetic head to be manufactured, whereby said step comprises:

the step of forming a magnetoresistive element along the surface of the first magnetic layer such that the magnetoresistive element extends in an electrically and magnetically isolated manner;

the step of forming a third magnetic layer which extends along said magnetoresistive element to constitute the other shield for the magnetoresistive type thin film magnetic head, and is coupled with said second magnetic layer formed within said recessed portion to constitute the remaining part of said one of poles for the inductive type thin film magnetic head;

the step of forming a write gap layer which extends along at least a surface of the third magnetic layer;

the step of forming a fourth magnetic layer along a surface of the write gap layer such that the fourth magnetic layer is opposed to said third magnetic layer and is magnetically coupled with said second magnetic layer at a rear position remote from the air bearing surface to constitute the other pole for the inductive type thin film magnetic head; and the step of polishing the air bearing surface.

The present invention also relates to a common unit which can be commonly used for manufacturing composite type thin film magnetic heads having various characteristics in an efficient manner.

According to the invention, a common unit for composite type thin film magnetic head comprises:

a substrate having a recessed portion formed in a surface thereof;

a first magnetic layer constituting one of shields for a magnetoresistive type thin film magnetic head and extending along said surface of the substrate from an end surface constituting an air bearing surface to at least a vicinity of an edge of said recessed portion;

a second magnetic layer constituting a part of one of poles for an inductive type thin film magnetic head and extending over a part of an inner surface of the recessed portion such that the second magnetic layer is magnetically separated from the first magnetic layer; and at least a part of a thin film coil of the inductive type thin film magnetic head formed within said recessed portion in an electrically isolated manner by an insulating layer.

The above mentioned composite type thin film magnetic head according to the present invention has a major difference from the known composite type thin film magnetic head in that one of poles for the inductive type thin film magnetic head is divided into the second magnetic layer and the third magnetic layer. The composite type thin film magnetic head according to this invention may be classified into a first basic structure in which a part of the thin film coil of the inductive type thin film magnetic head is formed within the recessed portion and the remaining part of the thin film coil is formed above the first mentioned thin film coil formed within the recessed portion, and a second basic structure in which the thin film coil of the inductive type thin film magnetic head is wholly formed within the recessed portion.

In the above first basic structure, a reference position of throat height zero of the inductive type thin film magnetic head is defined by an edge of an insulating layer supporting the thin film coil formed above the thin film coil provided within the recessed portion in an isolated manner by means of an insulating layer, and an apex angle is defined by an inclination angle of a side surface of the insulated layer.

In the above mentioned second basic structure, the reference position of throat height zero of the inductive type thin film magnetic head is defined by the edge of the recessed portion, and the apex angle is defined by an inclination angle of the side wall of the recessed portion. In this case, an inclination angle of the side wall of the recessed portion defining the apex angle may be preferably set to 45–75°, particularly 55–65°.

In the second basic structure, it is preferable that the surface of the first magnetic layer opposite to the substrate is coplanar with the surface of the insulating layer opposite to a bottom surface of the recessed portion, said insulating layer isolating the thin film coil formed within the recessed portion.

Moreover it is preferable to provide a non-magnetic layer on a surface of said insulating layer opposite to the bottom surface of the recessed portion such that a surface of said non-magnetic layer opposite to the substrate is coplanar with the surface of the third magnetic layer opposite to the substrate.

In the above structure, it is preferable that the write gap layer is formed to extend along the coplanar surfaces of said third magnetic layer and non-magnetic layer, and said fourth magnetic layer is formed to extend along the flat surface of the write gap layer. Such a flat surface can be easily manufactured to have a highly precise dimension.

Further, in the second basic structure, it is preferable that when it is predicted that a throat height which will be obtained with reference to a position of throat height zero defined by the edge of the recessed portion becomes longer than a desired value, a non-magnetic layer is provided above said recessed portion such that a surface of the non-magnetic layer is higher than that of the third magnetic layer and an edge of the non-magnetic layer projects toward the air bearing surface beyond the edge of the recessed portion, said write gap layer is extended from the surface of said third magnetic layer opposite to the substrate to the surface of the non-magnetic layer opposite to the substrate to include a step, and said forth magnetic layer is extended over the surface of the write gap layer to include a step corresponding said step of the write gap layer.

In the above explained structure, since the reference position of throat height zero is defined by the edge of the non-magnetic layer closer to the air bearing surface than the edge of the recessed portion, the throat height can be shortened. It should be noted that even in this case, the MR Height is not shortened and is remained at a desired value.

In the composite type thin film magnetic head according to this invention, the non-magnetic layer is preferably provided between the inner surface of the recessed portion and the second magnetic layer.

Furthermore, the first magnetic layer may be formed to extend over the side wall of the recessed portion beyond its edge.

Moreover, the second magnetic layer may be coupled with the third magnetic layer in various manner, e.g. the inner edges of these magnetic layers may be aligned with each other, or the inner edge of the third magnetic layer may be projected inwardly beyond the inner edge of the second magnetic layer. In the latter case, there can be obtained a margin in positioning these magnetic layers, but the reference position of throat height zero approaches closer to the inner side, the throat height is liable to be prolonged.

In the above mentioned first basic structure, the insulating layer supporting the thin film coil portion formed above the thin film coil portion formed within the recessed portion may be preferably projected from the surface of the third magnetic layer opposite to the substrate, said write gap layer may be provided to extend from the surface of the third magnetic layer opposite to the substrate to the surface of said insulating layer beyond a step, and said fourth magnetic layer may be extended along the write gap layer to include a step corresponding to said step.

In this case, it is preferable to project the edge of the insulating layer toward the air bearing surface beyond the edge of the recessed portion to shift the reference position of throat height zero closer to the air bearing surface than the edge of the recessed portion.

Moreover, in the composite type thin film magnetic head according to the invention, in order to suppress the leakage of the magnetic flux, a width of at least the pole portion of the third magnetic layer extending from the air bearing surface is preferably made substantially equal to that of the write gap layer. Furthermore, in order to suppress the leakage of the magnetic flux much more efficiently, it is preferable to provide the trim structure in the surface of the third magnetic layer opposite to the substrate, said trim structure having a width substantially equal to that of the pole portions of the write gap layer and fourth magnetic layer.

In the composite type thin film magnetic head according to the present invention, the third magnetic layer is preferably made of a material having a higher saturation magnetic flux density than that of the second magnetic layer. As stated above, in the composite type thin film magnetic head according to this invention, the bottom pole is divided into two portions, i.e. the second magnetic layer and the third magnetic layer. When the third magnetic layer constituting the pole chip is made of a material having a higher saturation magnetic flux density than the second magnetic layer, the assembly can be processed much more easily during the manufacture and the manufacturing cost can be reduced upon compared with a case in which the bottom pole is wholly made of a material having a high saturation magnetic flux density.

Moreover, in the method of manufacturing the composite type thin film magnetic head according to the invention, when the thin film is wholly formed within the recessed portion, the magnetoresistive element is formed after the formation of the thin film coil, and thus the magnetoresistive element is not subjected to the heating treatment for forming the thin film coil and the property of the magnetoresistive element is not degraded. Therefore, it is advantageously for manufacturing the GMR element which has a higher reading sensitivity, but is liable to be degraded by heat. It should be noted that the influence of heat to the magnetoresistive element can be still mitigated in the method according to the invention, in which a part of the thin film coil is formed within the recessed portion and the remaining portion of the thin film coil is formed after the formation of the magnetoresistive element.

In the method of manufacturing a composite type thin film magnetic head according to the invention, it is preferable that said steps of forming the recessed portion in the substrate and of forming the first magnetic layer include the step of forming the first magnetic layer serving as a mask having an opening corresponding to the recessed portion to be formed, and the step of forming the recessed portion in the surface of the substrate by performing an etching process while the first magnetic layer is used as a mask. In order to form precisely the deep recessed portion having a depth not less than 5 $\mu$m, the first magnetic layer may be preferably formed by plating and the etching is performed by a reactive ion etching.

Furthermore, when all the thin film coil is formed within the recessed portion, by polishing the air bearing surface while the edge of the recessed portion is used as the positional reference, it is possible to obtain the inductive type thin film magnetic head, whose throat height is defined with respect to the edge of the recessed portion and whose apex angle is defined by an inclination angle of the side wall of the recessed portion. Since the position of the edge of the recessed portion does not change during the manufacturing process, the throat height and apex angle can be precisely formed to have desired values.

Moreover, in the manufacturing method according to this invention, it is preferable that after forming the thin film coil within the recessed portion, a first non-magnetic layer is formed on the insulating layer which isolates the thin film coil formed within the recessed portion, and at least said first non-magnetic layer is polished such that a surface of the first non-magnetic layer becomes coplanar with that of the first magnetic layer. Furthermore, it is preferable that after forming said magnetoresistive element and third magnetic layer, a second non-magnetic layer is formed on said first non-magnetic layer, and at least said second non-magnetic layer is polished such that a surface of the second non-magnetic layer becomes coplanar with that of the third magnetic layer.

It is further preferable that said write gap layer is formed to be flat on said coplanar surfaces of the third magnetic layer and second non-magnetic layer, and said fourth magnetic layer is formed to be flat on the flat surface of the write gap layer.

In the method of manufacturing a composite type thin film magnetic head according to the invention, it is preferable that a pole portion is formed by etching the write gap layer by means of a reactive ion etching while the pole portion of the third magnetic layer is used as a mask, and then the trim structure having a substantially equal width to that of the pole portions of the third magnetic layer and write gap layer is formed by etching the surface of the fourth magnetic layer by means of an ion beam etching while said pole portions are used as a mask.

By manufacturing the thin film magnetic head in this manner, a width of the fourth magnetic layer constituting the other pole becomes substantially equal to a width of the trim structure of the third magnetic layer constituting the pole chip. Therefore, the leakage of the magnetic flux between these magnetic layers can be suppressed and an effective track width can be narrowed to increase the surface recording density.

According to the invention, in the method of manufacturing and stocking a number of common units which can be commonly used for composite type thin film magnetic heads having various characteristics, it is preferable that when it is predicted that a throat height which will be obtained with reference to a position of throat height zero defined by the edge of the recessed portion becomes longer than a desired value although a MR height is equal to a desired value, after forming the third magnetic layer, a non-magnetic layer is formed above said recessed portion such that a surface of the non-magnetic layer is higher than that of the third magnetic layer and an edge of the non-magnetic layer projects toward the air bearing surface beyond the edge of the recessed portion, said write gap layer and fourth magnetic layer are formed on the surfaces of said third magnetic layer and non-magnetic layer to include a step, and the air bearing surface is polished while said edge of the non-magnetic layer is used as a positional reference.

According to the invention, when it is predicted that a desired NLTS characteristic could not be obtained by only the thin film coil formed within the recessed portion, it is desirable to form an additional thin film coil above the thin film coil provided within the recessed portion in such a manner that the additional thin film coil is isolated by an insulating layer.

Furthermore, when it is predicted that a throat height which will be obtained with reference to a position of throat height zero defined by the edge of the recessed portion becomes longer than a desired value although a MR height is equal to a desired value, said insulating layer supporting said additional thin film coil is formed such that a surface of the insulating layer is higher than that of the third magnetic layer and an edge of the non-magnetic layer projects toward the air bearing surface beyond the edge of the recessed portion, said write gap layer and fourth magnetic layer are formed on the surfaces of said third magnetic layer and insulating layer to include a step, and the air bearing surface is polished while said edge of the non-magnetic layer is used as a positional reference.

Moreover, in the common unit for a composite type thin film magnetic head according to this invention, it is preferable that the surfaces of the first magnetic layer, the end surface of the second magnetic layer and the surface of the non-magnetic layer are coplanar with each other.

BRIEF DESCRIPTION OF THE DRAWINGS

FIG. 1 is a cross sectional view showing a first step of a known method of manufacturing a conventional composite type thin film magnetic head;

FIGS. 2–9 are cross sectional views illustrating successive steps;

FIG. 10 is a cross sectional view depicting the completed conventional composite type thin film magnetic head;

FIG. 11 is a cross sectional view showing a pole portion of the conventional composite type thin film magnetic head;

FIG. 12 is a plan view of the convention composite type thin film magnetic head;

FIG. 13 is a cross sectional view and a front view of a first step of a first embodiment of the method of manufacturing a composite type thin film magnetic head according to this invention;

FIGS. 14–16 are cross sectional views and front views depicting successive steps;

FIG. 17 is a plan view of FIG. 16;

FIGS. 18–25 are cross sectional views and front views showing successive steps;

FIG. 26 is a plan view of FIG. 25.

FIG. 27 is a cross sectional view and a front view showing a next step;

FIG. 31 is a plan view of FIG. 30;

FIGS. 32–40 are cross sectional views and front views illustrating successive steps;

FIG. 40 is a cross sectional view and a front view depicting a next step;

FIG. 41 is a cross sectional view showing a first step of a third embodiment of the method of manufacturing a composite type thin film magnetic head according to this invention;

FIGS. 42–44 are cross sectional views illustrating successive steps;

FIG. 45 is a cross sectional view and a front depicting a complete composite type thin film magnetic head; and FIG. 46 show a cross sectional view and a front views showing a fourth embodiment of the method of manufacturing a composite type thin film magnetic head according to the present invention.

DESCRIPTION OF THE PREFERRED EMBODIMENTS

Figures 28A, 28B:
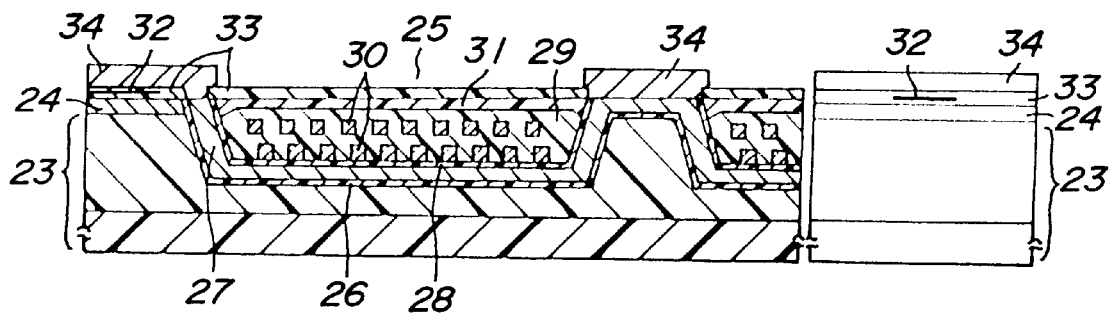
FIG. 28 is a cross sectional view and a front view illustrating an intermediate step of a second embodiment of the method of manufacturing a composite type thin film magnetic head according to this invention.

A first embodiment of the composite type thin film magnetic head and the method of manufacturing the same according to the invention will be described hereinafter with reference to FIGS. 13–27. In these figures, A denotes a cross sectional view cut along a line perpendicular to the air bearing surface and B denotes a front view showing an end face of the air bearing surface side. In general, in case of manufacturing the composite type thin film magnetic head, a number of magnetic heads are simultaneously formed on a wafer, and therefore until the wafer is divided into particular magnetic heads, the end surface could not be seen. However, for the sake of explanation, the end face is shown in the drawings.

As shown in FIG. 13, an insulating layer 22 made of alumina and having a thickness of about 10 $\mu$m is formed on one surface of a substrate main body 21 made of AlTiC. In this specification, an assembly of the substrate body 21 and insulating layer 22 is called a substrate or wafer 23. Furthermore, in this specification, an insulating layer means a film having at least an electrically insulation property and may have or may not have a non-magnetic property. In general, a material such as alumina having both the electrically insulating property and non-magnetic property is used, and therefore the insulating layer and the non-magnetic layer are sometimes used to have the same meaning.

Next, a first magnetic layer 24 constituting one of shields for a magnetoresistive type thin film magnetic head is formed on the insulating layer 22 of substrate 23 in accordance with a given pattern having an opening 24a at a portion at which a recessed portion is to be formed. By using this first magnetic layer 24 as a mask, a reactive ion etching is conducted to form a recessed portion 25 in a surface of the insulating layer 22 as shown in FIG. 14. In FIG. 14, an island-like part of the insulating layer 22 remains at a center of the recessed portion 24 and the insulating layer is formed on its top. This structure is needed for coupling the other pole to be formed later with the one pole.

In the present embodiment, said first magnetic layer 24 is made of a permalloy and is formed by plating. In the reactive ion etching, a gas such as $BCl_3$, $Cl_2$, $CF_4$ and $SF_6$ may be used as an etching gas. The reactive ion etching can form the deep recessed portion having a depth not less than 5 μm in a short time period. In this embodiment, the recessed portion 25 has a depth of 7–8 μm. In the present embodiment, the apex angle is determined by an inclination angle of a side wall of the recessed portion 25, and this angle may be preferably set to 45–75°, particularly 55–65°. In this embodiment, the angle is about 60°.

Next, in order to form one of poles, a mask made of a photoresist is formed on the surface of the first magnetic layer 24 in accordance with a predetermined pattern as shown in FIG. 15, and the first magnetic layer 24 is selectively etched. During this etching process, the first magnetic layer 24 formed on the island-like insulating layer 22 is removed.

Although in this embodiment, the one of shields is formed by etching the first magnetic layer 24 used as the mask for forming the recessed portion 25 into a desired pattern, the mask for forming the recessed portion may be made of a metal or metal compound and the first magnetic layer may be formed in accordance with a predetermined pattern after removing the mask.

Subsequently as shown in FIG. 16, an insulating layer 26 made of alumina is formed, with a thickness of 0.3–0.5 μm, on the inner surface of the recessed portion 25 and on the first magnetic layer 24, then a second magnetic layer 27 constituting a part of one of poles and having a thickness of about 4 μm is formed in accordance with a given pattern on the insulating layer 26, and thereafter an insulating layer 28 made of alumina is formed with a thickness of 0.5–1 μm on said second magnetic layer.

FIG. 17 is a plane view showing the second magnetic layer 27 formed in accordance with the predetermined pattern as mentioned above. In FIG. 17, the insulating layer 28 formed on the second magnetic layer 27 is omitted and a thin film coil and a pair of poles for an inductive type thin film magnetic head to be formed later are denoted by imaginary lines.

In an actual manufacturing process, after many composite type thin film magnetic heads are formed on a wafer in matrix, the wafer is cut into plural bars and a side surface of a bar is polished to form air bearing surfaces, and finally a bar is cut into respective composite type thin film magnetic heads. Therefore, in the condition shown in FIG. 17, the end surface does not appear, but for the sake of explanation, the end surface is shown. The front view of this end surface is, therefore, denoted in B in FIGS. 13–16 and succeeding figures.

Subsequently as shown in FIG. 18, a two-layered thin film coil 30 is formed within the recessed portion 25 on which the insulating layer 26, second magnetic layer 27 and insulating layer 28 are formed, said thin film coil being isolated by an insulating layer 29. The surface of the thin film coil 30 is flattened by annealing at 200–250° C.

Next, as depicted in FIG. 19, an insulating layer 31 made of alumina and of thickness 3–4 μm is formed on the whole surface. The insulating layer 31 may be made of silicon oxide instead of alumina.

Subsequently as shown in FIG. 20, the surface of the insulating layer 31 is flattened by chemical mechanical polishing (CMP) to expose the surface of the first magnetic layer 24 such that the surface of the insulating layer 31 becomes coplanar with that of the first magnetic layer 24. By this treatment, the original thickness of about 4 μm of the first magnetic layer 24 has been reduced to about 3 μm.

Moreover, in this condition, the edge of the second magnetic layer 27 is exposed to the surface.

In the present invention, the structure shown in FIG. 20 is called a common unit for thin film magnetic head which can be commonly used for manufacturing composite type thin film magnetic heads having various characteristics. Many common units may be manufactured and stocked, and composite type thin film magnetic heads having various characteristics required by users may be manufactured by using the common unit as a starting material. Then, various requirements of the users can be appropriately satisfied and desired composite type thin film magnetic heads can be speedily supplied.

Subsequently as shown in FIG. 21, a shield gap layer 33 having a MR layer 32 embedded therein is formed on the first magnetic layer 24. The shield gap layer is formed as follows. After forming an alumina film having a thickness of about 0.1 μm, the MR layer 32 constituting an AMR element or GMR element is formed in accordance with a predetermined pattern, and after forming an electric lead pattern (not shown) for the MR layer, an alumina film of thickness 0.1 μm is formed. In FIG. 21, for the sake of clarity, these alumina films are shown as a single integrated shield gap layer 33. Furthermore, the MR layer 32 is formed only on the area of the pole portion to be formed on the first magnetic layer 24, but the shield gap layer 33 is formed on the whole surface.

Next, portions of the shield gap layer 33, which are formed on the end surface and island-like portion of the second magnetic layer 24, are selectively removed. Although this process may be carried out by a lift-off process, in this embodiment, a photolithography is used, in which the alumina forming the shield gap layer 33 is selectively removed by a reactive ion etching with $BCl_3$ based gas.

Afterward as shown in FIG. 22, a third magnetic layer 34 is formed such that it is coupled with the end surface of the second magnetic layer 27 at the edge of the recessed portion. In this embodiment, the third magnetic layer 34 is made of a permalloy and is formed by plating to have a thickness of about 3.5 μm. Then, as shown in FIG. 23, an insulating layer 35 of alumina is formed on the whole surface with a thickness of several micron meters and is ground by CMP into a flat surface to expose the third magnetic layer 34.

During this process, the third magnetic layer 34 is partially over-etched, and thus a thickness of the third magnetic layer is reduced to about 3 μm. At the same time, the surface of the third magnetic layer formed on the island-like portion is exposed.

Subsequently as shown in FIG. 24, a write gap layer 36 made of alumina is formed on the whole surface with a thickness of 150–200 nm, and after selectively removing the write gap layer on the island-like portion to expose the third magnetic layer 34, a fourth magnetic layer 37 constituting the other pole and having a thickness of about 3 μm is formed in accordance with a predetermined pattern. The fourth magnetic layer 37 includes a pole portion having a narrow width. The fourth magnetic layer 37 is brought into contact with the third magnetic layer 34 formed on the above mentioned island-like portion and the third magnetic layer 34 is coupled with the second magnetic layer 27. In this manner, the magnetic circuit surrounding a part of the thin film coil 30 is constructed.

As shown in FIGS. 25 and 26, the write gap layer 36 in the vicinity of the pole portion of the fourth magnetic layer 37 is removed by the reactive ion etching, in which the pole portion of the fourth magnetic layer is used as a mask. The removal of write gap layer 36 by the reactive ion etching enables a process time to be shorter, and thus a reduction in thickness of the fourth magnetic layer 37 can be suppressed.

Next, as shown in FIG. 27, the surface of the third magnetic layer 34 is partly etched by the ion beam etching, in this embodiment by the ion milling to form the trim structure, while the pole portions of the fourth magnetic layer 37 and write gap layer are used as a mask. By forming the trim structure by using the pole portions of the fourth magnetic layer 37 and write gap layer 36 as a mask, the thus formed trim structure can be precisely aligned with the other pole formed by the fourth magnetic layer, and thus the leakage of the magnetic flux can be effectively prevented.

Moreover by suitably selecting an etching angle of the ion beam etching for the third magnetic layer 34, the configuration of the side wall of the trim structure can be optimized.

Furthermore, after forming an overcoat layer 39 made of alumina on the whole surface with a thickness of 3–5 μm, the etching is performed to expose contact pads connected to the thin film coil 30 of the inductive type thin film magnetic head and to the MR layer 32 of the magnetoresistive thin film magnetic head. In this embodiment, since the fourth magnetic layer 37 has a flat surface, the above mentioned overcoat layer 39 can be thin, and the etching process for exposing the above mentioned contact pad pattern can be done by the ion milling or reactive ion etching in a short time. Contrary to this, a conventional composite type thin film magnetic head needs a thick overcoat layer and a long etching time is required for exposing the contact pads.

After the above mentioned respective components of composite type thin film magnetic heads have been formed on the wafer 23, the wafer is cut into bars, in each of which many composite type thin film magnetic heads are aligned and a side surface of a bar is polished to form the air bearing surfaces. Then, the bar is cut into respective composite type thin film magnetic heads.

In this embodiment, during the polishing process for forming the air bearing surfaces, a position of the edge of the recessed portion 25 is taken as the positional reference of throat height zero. Since this position does not change during the manufacturing process, the throat height and the MR Height can be precisely formed to have desired values. Moreover, the apex angle is determined by the inclination angle of the side wall of the recessed portion 25, and this angle can be precisely formed in a desired value during the formation of the recessed portion and does not change during the manufacturing process. Therefore, the inductive type thin film magnetic head having the desired apex angle can be obtained. Due to the above mentioned effects according to the invention, the composite type thin film magnetic head can be sufficiently miniaturized without degrading characteristics.

Furthermore, since the MR layer 32 is formed after forming the thin film coil 30 which requires the heating treatment at about 250° C., the characteristics of the MR layer are not affected by the heating treatment. This is particularly advantageous for utilizing the GMR layer which has an extremely high sensitivity, but is influenced by the heating treatment.

Now a second embodiment of the composite type thin film magnetic head and the method of manufacturing the same according to this invention will be explained with reference to FIGS. 28–32. In the following embodiments, portions similar to those in the first embodiment are denoted by the same reference numerals used in the first embodiment.

In this embodiment, manufacturing steps up to the step shown in FIG. 28 are substantially same as those illustrated in FIGS. 13–21 in the first embodiment. In this embodiment, the shield gap layer 33 having the MR layer 32 embedded therein at an area near the air bearing surface is formed on a whole surface, parts of the shield gap layer on the end surface of the second magnetic layer 27 and on island-like portion are selectively removed, and the third magnetic layer 34 is formed such that its inner edge extends inwardly beyond the inner edge of the second magnetic layer 27. In the first embodiment, the third magnetic layer is arranged such that its inner edge is aligned with the inner surface of the second surface.

In the present embodiment, by forming the third magnetic layer 34 in the above mentioned manner, there is obtained a margin in the photolithography for positioning the third magnetic layer 34 with respect to the second magnetic layer 27, and therefore the manufacture process becomes simple.

On the other hand, since the reference position of throat height zero is shifted inwardly beyond the edge of the recessed portion 25, the throat height become longer. In the case that the throat height is too long, an amount of polishing the air bearing surface may be increased in order to shorten the throat height, but then the MR height might become smaller than a required value.

Figures 29A, 29B:
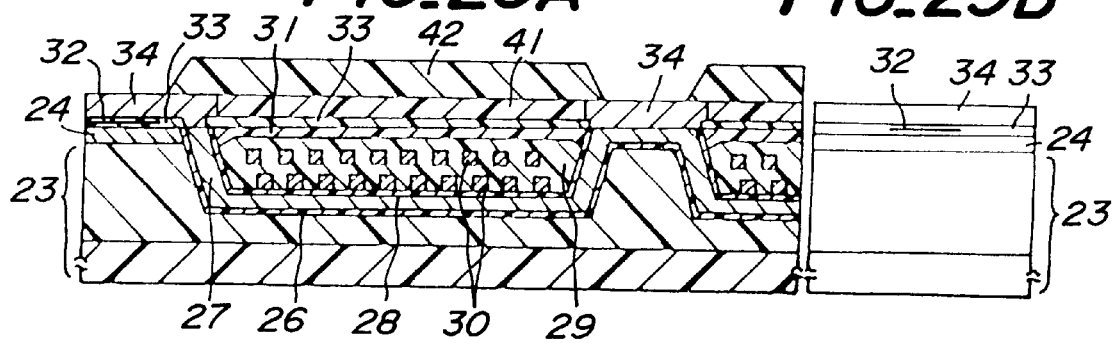
FIGS. 29 and 30 are cross sectional views and front view showing successive steps.

For solving this problem, in this embodiment, as shown in FIG. 29, after forming an insulating layer 41 on the shield gap layer 33 provided at an opening of the recessed portion 25, a surface of the insulating layer is flattened by CMP such that the surface of insulating layer becomes coplanar with that of the third magnetic layer 34, and an insulating layer 42 is formed such that its surface projects upwardly from the surface of the third magnetic layer 34 and its edge projects toward the air bearing surface beyond the edge of the recessed portion. In the present embodiment, these insulating layers 41 and 42 are made of photoresist, but they may be made of other insulating material such as silicon oxide.

Figures 30A, 30B:
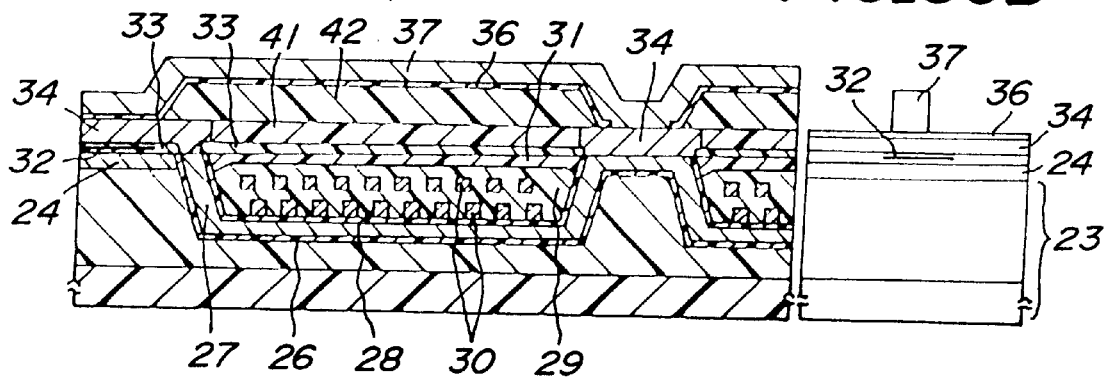

Subsequently, as shown in FIG. 30, the write gap layer 36 is formed to extend from the surface of the third magnetic layer 34 to the surface of the insulating layer 42 including a step, and then the fourth magnetic layer 37 is formed on the write gap layer. FIG. 31 is a plan view showing a condition after the formation of the fourth magnetic layer 37. As shown in FIG. 31, in this embodiment, the first magnetic layer 24 does not surround the whole periphery of the recessed portion, but is formed to extend only to a part of the edge of the recessed portion opposing to the air bearing surface. FIG. 31 shows a condition, in which the third magnetic layer 34 extends over the inner wall of the recessed portion 25 beyond its edge as explained above.

Next, as shown in FIG. 32, the write gap layer 36 is etched by using the pole portion of the fourth magnetic layer 37 as a mask, then the surface of the third magnetic layer 34 is etched to form the trim structure, and the overcoat layer 39 is formed on the whole surface.

As explained above, in the present embodiment, the reference position is determined not by the edge of the recessed portion 25, but by the edge of the insulating layer 42 projecting toward the air bearing surface side, and therefore the throat height can be shortened without shortening the MR Height.

Next, a third embodiment of the composite type thin film magnetic head and the method of manufacturing the same will be described with reference to FIGS. 33–40.

The NLTS is one of characteristics determining the performance of the inductive type thin film magnetic head of the composite type thin film magnetic head. This characteristic determines an efficiency of the inductive type thin film magnetic head and relates to the number of windings of the thin film coil. According to the present invention, the thin film coil is provided within the recessed portion formed in the substrate, but in some cases thus formed thin film coil is not sufficient to obtain the desired NLTS characteristic. Moreover, a specification for NLTS characteristic required by users could not be sometimes satisfied by the usual NLTS characteristic. According to the invention, when the number of coil windings is too small, an additional thin film coil may be formed above the thin film coil arranged within the recessed portion.

The manufacturing steps up to FIG. 33 in this embodiment are similar to those shown in FIGS. 13–22. In this embodiment, after the third magnetic layer 34 has been formed in accordance with predetermined pattern and the shield gap layer (reference numeral 33 in FIG. 33) formed on the surface of the recessed portion 25 has been selectively removed, a third layer thin film coil 51 is formed and spaces between coil windings are filled with a SOG (Spin-on-Glass) film 52 of silicon oxide to isolate the third thin film coil. Afterward, an insulating layer 53 made of alumina is formed on the whole surface with a thickness of 4–6 μm as shown in FIG. 33.

Next, as depicted in FIG. 34, the surface of the insulating layer 53 is flattened by CMP, during which the surface of the third magnetic layer 34 is over-etched. By this over-etching, a thickness of the third magnetic layer 34 is reduced to about 3 μm. In this manner, the surfaces of the third magnetic layer 34 and insulating layer 53 become coplanar with each other. By this flattening treatment, a part of the third layer thin film coil which will be connected with a fourth layer thin film coil to be formed later, is exposed, but this connecting part of the third layer thin film coil is not shown in the drawing.

Next, a fourth layer thin film coil 55 is formed on the surface of the flattened insulating layer 53 such that the fourth layer thin film coil is isolated by an insulating layer 54 as shown in FIG. 35. This insulating layer 54 is made of photoresist like as the insulating layer 29 and is annealed at about 250° C. in order to obtain a flat surface.

Next, as shown in FIG. 36, the write gap layer 36 made of alumina and having a thickness of 150–25- nm is formed on the surfaces of the third magnetic layer 34 and the insulating layer 54 and a part of the write gap layer formed on the island-like portion is selectively removed to form an opening.

Furthermore, as illustrated in FIG. 37, the fourth magnetic layer 37 is formed on the write gap layer, and the write gap layer 36 is etched wile the pole portion of the fourth magnetic layer is used as a mask as shown in FIG. 38. Then, the third magnetic layer 34 is etched to form the trim structure as depicted in FIG. 39. Furthermore, as shown in FIG. 40, the overcoat layer 39 made of alumina is formed on the whole surface.

According to this embodiment, if a desired NLTS characteristic could not be obtained only by the thin film coil 30 arranged within the recessed portion 25 formed in the substrate 23, e.g. the thin film coil preformed in the common unit for composite type thin film magnetic head, the third layer thin film coil 51 and fourth layer thin film coil 55 may be formed above the preformed thin film coil.

Although the four thin film coil layers are provided, more than a half thereof is formed within the recessed portion, a height of the coil measured from the surface of the substrate is not so high, and therefore the thick insulating layer is not required like as the conventional thin film magnetic head and the reference position of throat height zero does not shift. Moreover, since it is not necessary to form the thick overcoat layer, undesired stress is not applied to the substrate.

Moreover, in the present embodiment as well as in the second embodiment, the reference position of throat height zero is not defined by the edge of the recessed portion, but is defined by the edge of the insulating layer 54 supporting the fourth layer thin film coil 55 in an isolated manner. Since the edge of the insulating layer 54 projects toward the air bearing surface beyond the edge of the recessed portion, the throat height can be shortened without shortening the MR Height.

FIGS. 41–45 show a fourth embodiment of the composite type thin film magnetic head and the method of manufacturing the same according to this invention. Although in the previous embodiments, the alumina insulating layer 22 is stacked on the AlTiC substrate main body 21 to constitute the substrate 23 and the recessed portion 25 is formed only in the insulating layer 22, in the present embodiment, on the surface of the AlTiC substrate main body 21 is formed an alumina insulating layer 61 of about 0.5–1 μm thickness, on which the first magnetic layer 24 is formed in accordance with a desired pattern.

As shown in FIG. 42, a reactive ion etching is conducted while the first magnetic layer 24 is used as a mask to form the recessed portion 25 which extends into the AlTiC substrate main body 21 through the alumina insulating layer 61. Furthermore, in this embodiment, an alumina insulating layer 62 having a thickness of 0.5–1 μm is uniformly formed on the inner surface of the recessed portion 25, and then the insulating layer 26 is formed on the alumina insulating layer 62 like as the first embodiment shown in FIG. 16.

The succeeding steps are similar to those of the first embodiment shown in FIGS. 16–27, and the structure shown in FIG. 45 can be obtained finally.

This embodiment is different from the previous embodiments in that the substrate is formed by the AlTiC substrate main body 21 covered with the thin insulating layer 61 and the recessed portion 25 is formed to reach the substrate main body. It should be noted that according to the present invention, the substrate may be formed only by the AlTiC substrate body 21 without the insulating layer 61. The substrate may be made of various materials.

FIG. 46 shows a fifth embodiment of the composite type thin film magnetic head according to this invention. Although in the embodiments explained so far, the first magnetic layer 24 extends up to the edge of the recessed portion, in this embodiment, the first magnetic layer extends over the side wall of the recessed portion. The structure except for the first magnetic layer is similar to that of the first embodiment. In this embodiment, the first magnetic layer 24 is formed to extend over the side wall or even the bottom surface of the recessed portion. By constructing the first magnetic layer in this manner, the magnetic shield effect for the magnetoresistive type thin film magnetic head can be improved, and therefore the thin film magnetic head of the present embodiment may be advantageously used under a sever condition of external magnetic field.

There are several methods for manufacturing the first magnetic layer extending overt the inner surface of the recessed portion, for instance after forming the recessed portion like as the previous embodiments, a magnetic layer may be formed on the inner surface of the recessed portion such that this magnetic layer is continuous from the first magnetic layer; or after forming the recessed portion by using a metal or metal compound mask and removing the metal or metal compound mask, the first magnetic layer 24 may be formed to extend over the side wall or bottom surface of the recessed portion. In this case, the metal or metal compound mask may be made of a permalloy like as the first magnetic layer, but may be made of a metal such as Cu, Ni, Cr and compounds thereof.

This invention is not limited to the above embodiments and many alternations and modifications may be conceived within the scope of the invention. For example, in the above embodiments, the first and the fourth magnetic layers are made of a permalloy, NiFe (20%,80%) and the second magnetic layer is made of a permalloy, NiFe (50%,50%) having a higher saturation magnetic flux density than the first mentioned permalloy, but the third magnetic layer may be made of a magnetic material having a high saturation magnetic flux density such as FeN or amorphous Fe—Co—Zr. Furthermore, these materials may be used by stacking two or more kinds. The first through fourth magnetic layers may be made of a same permalloy. Since a magnetic material having a high saturation magnetic flux density is liable to be oxidized and is difficult to be handled, it is advantageous that only the third magnetic layer is made of such a material.

Moreover, materials and thicknesses of various members, manufacturing methods and etching methods are not limited to those explained in the above embodiments, but they may be appropriately selected within the obvious scope of a person skilled in the art.

According to the composite type thin film magnetic head, the method of manufacturing the same, and the common unit for composite type thin film magnetic head according to the present invention, the performance and manufacturing yields of the thin film magnetic head can be improved. The reason is that since the magnetic material with high saturation magnetic flux density can be used as the third magnetic layer constituting the magnetic pole, the magnetic flux generated by the thin film coil does not saturate and can reaches efficiently the writing area, and thus a loss of the magnetic flux can be decreased. Other advantages of the present invention may be summarized as follows.

In the known composite type thin film magnetic head shown in FIG. 11, the top pole has the double structure of the pole chip and the other pole, but the magnetic head of the present invention does not have such a double structure and therefore, the other pole having a large width is not exposed on the air bearing surface at the writing pole portion, undesired phenomena such as the side write in the known magnetic head does not occur. Thus, the effective track width is not increased and undesired phenomena of writing data in an adjacent track does not occur.

Although the composite type thin film magnetic head according to the invention has the normal structure in which the inductive type thin film magnetic head is stacked on the magnetoresistive type thin film magnetic head, after the whole or more than half of the thin film coil has been formed, the MR layer of the magnetoresistive type thin film magnetic head can be formed, and therefore characteristics of the MR layer are not degraded by the heating treatment or humidity absorption, and the GMR layer which is particularly affected by heat can be advantageously used. In connection with the above advantage, damage by electrostatic charge during the handling can be suppressed largely, because the number of manufacturing steps after the formation of the MR layer is small.

In the conventional composite type thin film magnetic head, the electrode pattern extending from the MR layer is isolated from the one shield and the other shield by means of the shield gap layer formed by the alumina insulating film having a thickness of about 0.1–0.2 $\mu$m. In general, this alumina film is formed by spattering and has a poor insulation due to pin holes or particles, and many defective products are manufactured. According to the present invention, an area over which the electrode pattern is brought into contact with the thin shield gap layer is very small and the remaining portion of the electrode pattern is isolated by means of the thick alumina film, and therefore a possibility of insulation defect is very small.

In the embodiment of this invention, in which the whole thin film coil is formed within the recessed portion, the reference position of throat height zero for the inductive type thin film magnetic head and the apex angle are defined by the edge position and the inclination angle of the side wall of the recessed portion, respectively, said position being not shifted during the manufacturing process, and therefore the inductive type thin film magnetic head having the desired throat height and apex angle can be obtained precisely.

Moreover, after the thin film coil has been formed within the recessed portion and its surface has been flattened, the flat write gap layer and flat fourth magnetic layer are formed successively. Therefore, the pole portions of these layers can be miniaturized precisely and the track width can be made small.

Furthermore, the overcoat layer can be formed on the flat surface, its thickness can be thin. Therefore, undesirable stress is not applied to the substrate, and the openings for exposing the contact pads connected to the MR layer and thin film coil through the electrode pattern can be formed by the dry etching such as reactive ion etching and ion beam etching, and thus the process time can be shorten.

Furthermore, even when the whole thin film coil is not formed within the recessed portion, since more than half of the thin film coil is formed within the recessed portion, a height of the thin film coil measured from the surface of the substrate can be substantially shorter than that of the known composite type thin film magnetic head without the recessed portion, and the miniaturization of the pole portion can be realized.

When the front end of the insulating layer supporting the thin film coil portion formed above the recessed portion is extended beyond the edge of the recessed portion toward the air bearing surface, the reference position of throat height zero is shifted toward the air bearing surface and the throat height can be shortened. In this case, the MR Height is not affected at all. This effect can be obtained also in the case in which the whole thin film coil is formed within the recessed portion and the insulating layer is formed to project from the flat surface of the thin film coil such that the front edge of this insulation film projects toward the air bearing surface beyond the edge of the recessed portion.

In the common unit for composite type thin film magnetic head according to the invention, by manufacturing and stocking the common unit having one of shields, a part of one of poles and a thin film coil formed therein, various composite type thin film magnetic heads desired specifications required by users can be speedily supplied, and therefore the number of days from the order to the supply can be shorten less than a half of that of the conventional method. Moreover, when specifications required by users could not be satisfied only by the thin film coil formed within the recessed portion, at least one additional thin film coil can be easily formed on the previously formed thin film coil, and thus various specifications can be speedily satisfied.

Although the additional thin film coil is formed, since a greater part of the whole thin film coil is formed within the recessed portion, a height of, for instance a four-layered thin film coil projecting from the surface of the substrate is not large, and the miniaturization of the pole portion is not influenced at all.

What is claimed is:

1. A composite type thin film magnetic head of normal structure, in which a magnetoresistive type thin film magnetic head for reading is formed on a substrate and an inductive type thin film magnetic head for writing is stacked on the magnetoresistive type thin film magnetic head, comprising:
    a substrate having a recessed portion formed in one surface thereof;
    a first magnetic layer formed to extend on said surface of the substrate from an end surface forming an air bearing surface to at least a vicinity of an edge of said recessed portion, said first magnetic layer forming one shield for the magnetoresistive type thin film magnetic head;
    a second magnetic layer formed to extend over a part of an inner surface of the recessed portion such that the second magnetic layer is magnetically separated from the first magnetic layer, said second magnetic layer forming a part of one pole of the inductive type thin film magnetic head;
    a thin film coil of the inductive type thin film magnetic head, at least a part of said thin film coil being formed within said recessed portion in an electrically isolated manner by an insulating film;
    a magnetoresistive element arranged within a shield gap layer in an electrically and magnetically separated manner, said shield gap layer extending along a surface of said first magnetic layer opposite to the substrate;
    a third magnetic layer formed to extend on a surface of said shield gap layer opposite to the substrate, said third magnetic layer forming another shield for the magnetoresistive type thin film magnetic head and being coupled with said second magnetic layer formed within said recessed portion to constitute a rest of said one pole of the inductive type thin film magnetic head;
    a write gap layer extending at least along a surface of the third magnetic layer opposite to the substrate; and
    a fourth magnetic layer formed to extend on a surface of said write gap layer opposite to the substrate to be opposed to said third magnetic layer and being coupled with said second magnetic layer at a rear position remote from the air bearing surface.

2. A composite type thin film magnetic head as claimed in claim 1, wherein said first magnetic layer is extended to the inner surface of the recessed portion beyond the edge thereof.

3. A composite type thin film magnetic head as claimed in claim 1, wherein said thin film coil of the inductive type thin film magnetic head is wholly formed within the recessed portion.

4. A composite type thin film magnetic head as claimed in claim 3, wherein said inductive type thin film magnetic head has a throat height formed by using a position of the edge of the recessed portion as a positional reference and an apex angle defined by an inclination angle of a side wall of the recessed portion.

5. A composite type thin film magnetic head as claimed in claim 4, wherein said inclination angle of the side wall of the recessed portion defining the apex angle is set to 45–75°.

6. A composite type thin film magnetic head as claimed in claim 5, wherein said inclination angle of the side wall of the recessed portion defining the apex angle is set to 55–65°.

7. A composite type thin film magnetic head as claimed in any of claim 3–6, wherein the surface of the first magnetic layer opposite to the substrate, said surface of the first magnetic layer being coplanar with a surface of the insulating layer opposite to a bottom surface of the recessed portion, said insulating layer isolating the thin film coil.

8. A composite type thin film magnetic head as claimed in claim 7, comprising a non-magnetic layer extending along the surface of the insulating layer opposite to the bottom surface of the recessed portion, a surface of said non-magnetic layer opposite to the substrate being coplanar with the surface of the third magnetic layer opposite to the substrate.

9. A composite type thin film magnetic head as claimed in claim 8, wherein said write gap layer extends along the coplanar surfaces of said third magnetic layer and non-magnetic layer, and said fourth magnetic layer extends along the flat surface of the write gap layer.

10. A composite type thin film magnetic head as claimed in claim 8, further comprising a non-magnetic layer extending along the surface of the insulating layer opposite to the bottom surface of the recessed portion, a surface of said non-magnetic layer opposite to the substrate being projected in a direction opposite to the substrate from the surface of the third magnetic layer opposite to the substrate to form a step, whereby said fourth magnetic layer extends along the write gap layer including the step to have a step corresponding to said step.

11. A composite type thin film magnetic head as claimed in claim 10, wherein said non-magnetic layer extends along the surface of the third magnetic layer opposite to the substrate beyond the edge of the recessed portion toward the air bearing surface.

12. A composite type thin film magnetic head as claimed in claim 4 or 5, wherein said magnetic head includes the air bearing surface which is formed by using a position of the edge of the recessed portion as a positional reference.

13. A composite type thin film magnetic head as claimed in claim 1, in which an inner end surface of the third magnetic layer situates more inwardly than the inner end surface of the coupling part of the second magnetic layer with the third magnetic layer.

14. A composite type thin film magnetic head as claimed in claim 1, wherein the magnetic head further comprises a first non-magnetic layer extending between the first magnetic layer and the surface of the substrate and extending along the inner surface of the recessed portion, and a second non-magnetic layer extending between said first non-magnetic layer and the second magnetic layer and being brought into contact with an inner side edge of the first magnetic layer.

15. A composite type thin film magnetic head as claimed in claim 1, wherein an inner end surface of the third magnetic layer is aligned with the inner end surface of the coupling part of the second magnetic layer with the third magnetic layer.

16. A composite type thin film magnetic head as claimed in claim 1, wherein a part of the thin film coil of the inductive type thin film magnetic head is formed within the recessed portion and the remaining part of the thin film coil is formed on the recessed portion on a side opposite to the substrate.

17. A composite type thin film magnetic head as claimed in claim 16, wherein the magnetic head further comprises another insulating film extending along the surface of said insulating film opposite to the substrate and projecting from the surface of the insulation film opposite to the substrate toward a direction opposite to the substrate, said write gap layer extends along the surface of the third magnetic layer opposite to the substrate and a surface of said another insulating film opposite to the substrate over a step, and said fourth magnetic layer extends along the write gap layer including the step to have a corresponding step.

18. A composite type thin film magnetic head as claimed in claim 17, wherein a part of said another insulating film extends along the surface of the third magnetic layer opposite to the substrate beyond the edge of the recessed portion toward the air bearing surface.

19. A composite type thin film magnetic head as claimed in claim 18, wherein said air bearing surface is formed by polishing while a position of a end surface of said another insulating film projecting toward the air bearing surface beyond the edge of the recessed portion is used as a positional reference.

20. A composite type thin film magnetic head as claimed in claim 1, wherein a width of at least the pole portion of the fourth magnetic layer extending from the air bearing surface is substantially equal to that of the write gap layer.

21. A composite type thin film magnetic head as claimed in claim 20, wherein a trim structure having a width substantially equal to that of the write magnetic layer and pole portion of the fourth magnetic layer is formed in the surface of said third magnetic layer opposite to the substrate.

22. A composite type thin film magnetic head as claimed in claim 1, wherein said third magnetic layer is made of a material having a higher saturation magnetic flux density than that of the second magnetic layer.

23. A composite type thin film magnetic head as claimed in claim 1, wherein magnetic head further comprises a non-magnetic layer inserted between the inner surface of the recessed portion and the second magnetic layer, and said first magnetic layer extends along the surface of the substrate such that the first magnetic layer is brought into contact with said non-magnetic layer.

24. A composite type thin film magnetic head as claimed in claim 23, wherein said first magnetic layer extends between the side wall of the recessed portion and a part of the non-magnetic layer formed along said side wall.

25. A common unit for composite type thin film magnetic head capable of being commonly used in manufacturing a composite type thin film magnetic head of normal structure, in which a magnetoresistive type thin film magnetic head for reading is formed on a substrate and an inductive type thin film magnetic head for writing is stacked on the magnetoresistive type thin film magnetic head, comprising:

a substrate having a recessed portion formed in a surface thereof;

a first magnetic layer formed to extend on said surface of the substrate from an end surface forming an air bearing surface to at least a vicinity of an edge of said recessed portion, said first magnetic layer forming one shield for the magnetoresistive type thin film magnetic head;

a second magnetic layer formed to extend on a part of an inner surface of the recessed portion such that the second magnetic layer is magnetically separated from the first magnetic layer, said second magnetic layer forming a part of one pole of the inductive type thin film magnetic head; and at least a part of a thin film coil of the inductive type thin film magnetic head formed within said recessed portion in an electrically isolated manner by an insulating layer.

26. A common unit for a composite type thin film magnetic head as claimed in claim 25, wherein a surface of the first magnetic layer, an end surface of the second magnetic layer and a surface of the insulating layer are formed to be coplanar with each other.

* * * * *